United States Patent [19]

DeLiban et al.

[11] 4,284,160

[45] Aug. 18, 1981

[54] VEHICLE GUIDANCE SYSTEM EMPLOYING RADIO BLOCKING

[75] Inventors: Robert DeLiban, Menlo Park; David G. Lieby, San Jose, both of Calif.

[73] Assignee: Barrett Electronics Corporation, Northbrook, Ill.

[21] Appl. No.: 21,335

[22] Filed: Mar. 19, 1979

[51] Int. Cl.³ ............................................. B62D 1/24
[52] U.S. Cl. .................................. 180/168; 104/299; 318/587
[58] Field of Search ................ 180/168, 167; 318/587; 246/5, 167 R, 34 B, 187 C; 104/297, 298, 299, 295

[56] References Cited

U.S. PATENT DOCUMENTS

| | | | |
|---|---|---|---|
| 2,847,080 | 8/1958 | Zworykin | 180/168 |
| 3,147,817 | 4/1964 | DeLiban | 180/168 |
| 3,245,493 | 4/1966 | Barrett, Jr. | 180/168 |
| 3,411,603 | 11/1968 | Kohls | 180/168 |
| 3,544,788 | 12/1970 | Guzik | 246/63 |
| 3,661,092 | 5/1972 | Morley | 104/299 |
| 3,669,206 | 6/1972 | Tax et al. | 318/587 |
| 3,734,229 | 5/1973 | Comer | 180/98 |

*Primary Examiner*—David M. Mitchell
*Assistant Examiner*—D. W. Underwood

*Attorney, Agent, or Firm*—Emrich, Root, Lee, Brown & Hill

[57] ABSTRACT

A guidance system for guiding a plurality of unmanned vehicles along a traffic layout includes a plurality of code devices which divide the traffic layout into a plurality of zones and identify each zone by a unique identifying code. Each vehicle includes control circuits having code sensors which sense the identifying code as the vehicle enters a zone and provide data to a present memory which stores present address data representing the identity of the zone in which the vehicle is now traveling. A past memory, which receives data from the present memory, stores past address data representing the identity of the zone in which the vehicle was previously traveling. The control circuits further include a time slot generator which provides timing signals defining a plurality of time slots each of which is assigned to a different zone. A comparator circuit responds to the past address data and the timing signals to effect transmission of a position signal during the time slot assigned to the zone in which the vehicle was previously traveling, and a further comparator circuit responds to the present address data and the timing signals to cause the vehicle to be halted whenever a position signal is received during the time slot assigned to the zone in which the vehicle is presently traveling.

26 Claims, 16 Drawing Figures

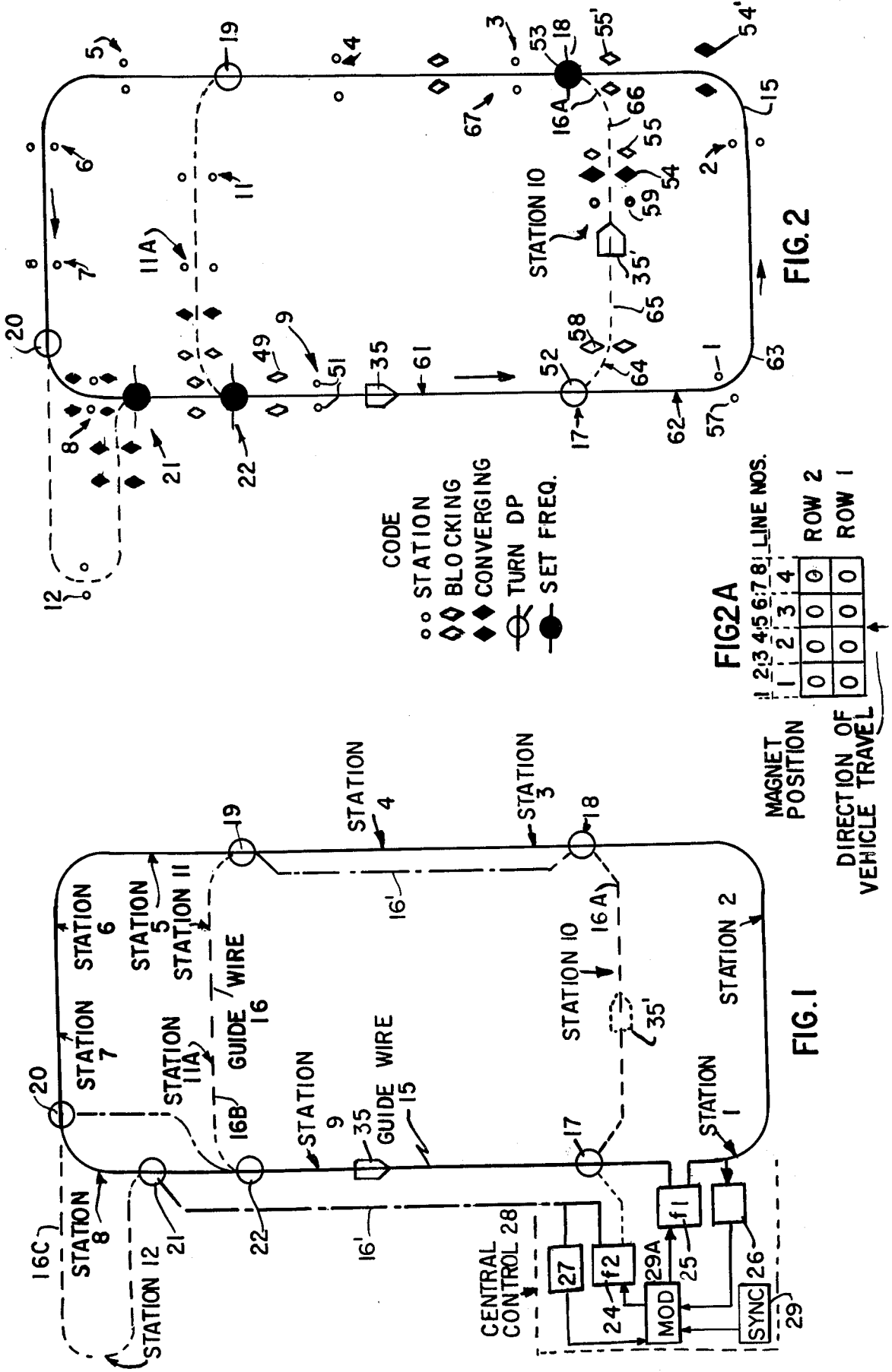

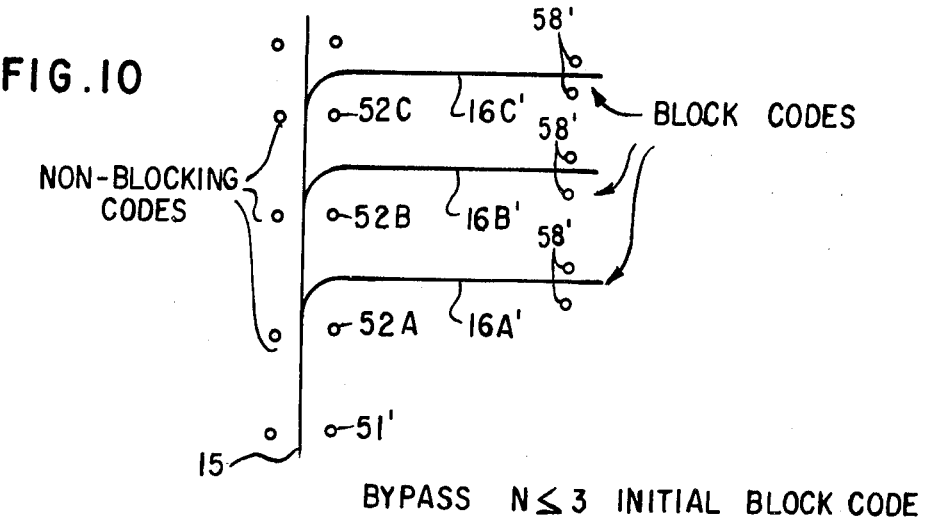
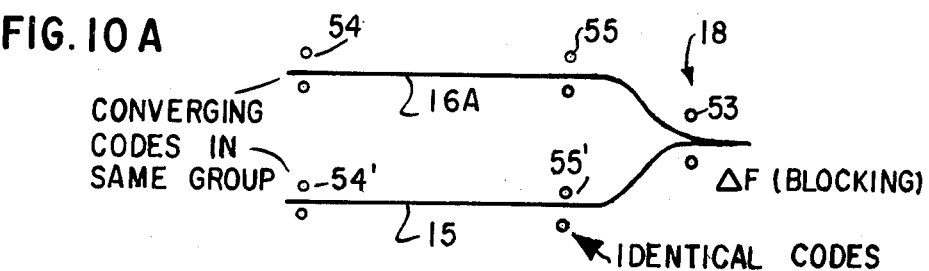
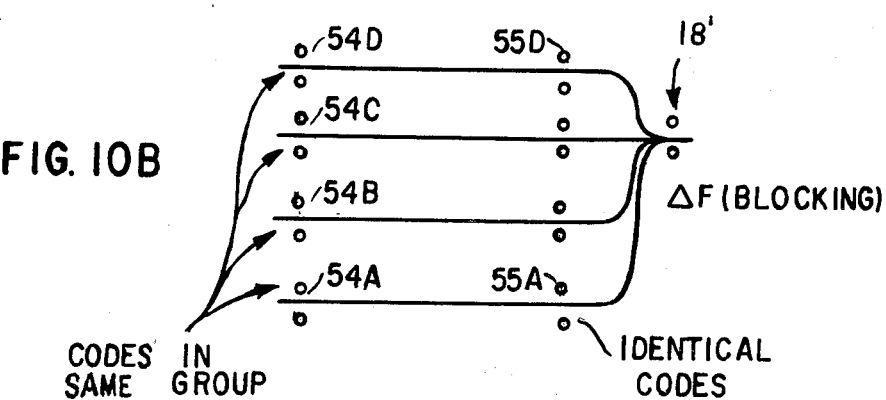
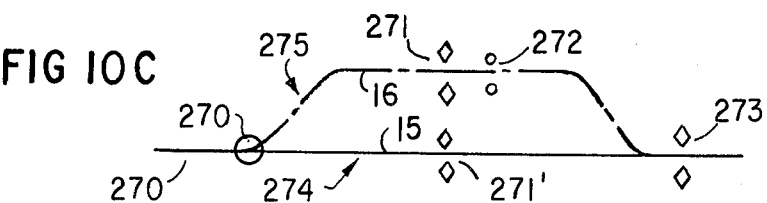

VEHICLE GUIDANCE SYSTEM EMPLOYING RADIO BLOCKING

BACKGROUND OF THE INVENTION

1. Field of the Invention

The present invention is directed to guidance systems, and more particularly to an improvement in a guidance system in which at least one mobile vehicle is guided along a traffic path defined by radiated signals to arrive at a predetermined location along a traffic layout.

2. Description of the Prior Art

Arrangements in which a traffic path has been used in the guidance of a driverless mobile unit along a desired course have been set forth in U.S. Pat. Nos. 3,009,525, and 3,147,817, issued to Robert DeLiban. In such disclosures, the traffic path is defined by a conductor energized to radiate an electro-magnetic field, and a sensing means on the vehicle is operative to detect the radiated energy and to control the vehicle steering means to follow such path.

In the system disclosed in the DeLiban U.S. Pat. No. 3,147,817, a plurality of driverless vehicles equipped with sensing means are operative to simultaneously follow energized conductor paths in a safe and reliable manner. In the patented arrangement, station selection means provided on each vehicle instruct the vehicle to proceed to any one of a plurality of stations located at different points along the path. Location-identification means at each station provides a unique code signal which is detectable by code sensing means on the vehicle, as the vehicle approaches a station, to enable halting of the vehicle when the vehicle arrives at the station selected.

The system includes a main traffic path and a plurality of secondary paths which branch away from the main path at different points designated as decision points, and whenever the vehicle arrives at a decision point in the system, one of at least two alternate paths is selected as a preferred path to a selected station. Each decision point includes an associated location-identification means which provides a unique code for the decision point. The code sensing means on the vehicle detects such code as the vehicle approaches the decision point, and a comparison means automatically controls the vehicle to follow the one of the paths which is predetermined as the preferred path from the decision point to the selected station.

The system further includes a beacon signalling arrangement wherein "hold beacons" are disposed along the layout of the guidance system, whereby each vehicle senses the presence of another vehicle preceding it by less than a preassigned minimum distance, and is halted while such other vehicle remains within the minimum distance. The halted vehicle simultaneously signals its presence to any vehicle which may attempt to follow too closely behind.

In this arrangement, each vehicle signals its presence as it passes through a block by radiating a presence signal which is transmitted over conductors to the hold beacon associated with that block. The presence of a vehicle within the limits of the block produces a hold signal at its associated block beacon. As a further vehicle enters the block and draws abreast of the hold beacon, receipt of the hold signal from the beacon is effective to disable the propulsion means of the second vehicle and thus stop the vehicle until the first vehicle leaves the block.

At converging points, a vehicle transmits a hold signal from one block to two separate hold beacons, each of which is positioned adjacent to a different traffic path. The hold signals provided by such beacons are effective to control movements of vehicles at converging points where vehicles traveling over different paths enter a common path.

In the U.S. Pat. No. 3,544,788 to Nicholas J. Guzik there is disclosed an electronic position indication system wherein position information signals are transmitted between trains traveling along the same track. Each train unit includes three position counters to indicate the position of its own train and the positions of train units immediately ahead and immediately behind. Magnetic inducers spaced at predetermined intervals along the track activate an "own train" counter and a radio transmitter in each train to generate a time signal for reception and activation of counters in the immediately ahead and behind train units. Whenever a minimum safe distance between two trains is reached, as indicated by the count difference for the counters, braking is applied to at least the following train.

While this system is effective in maintaining a predetermined minimum spacing between train units travelling over the same track, the system relies on successive pulse counting for indicating the position of each train unit, and the relative spacings between train units.

Another vehicle control system which employs two way communication is disclosed in the U.S. Pat. No. 3,734,229 issued to D. T. Comer. In this system, the traffic layout is defined by an array of conductors disposed along the traffic layout and energized with a low frequency AC signal for developing magnetic fields which are detectable by a vehicle carried guidance control unit.

An array of twin lead conductors disposed beneath the surface of the travel paths form a distributed antenna network provided a communication medium for two way communication between a stationary control unit and vehicle carried control units, permitting transmission of heading command signals to the vehicle from the stationary control unit.

SUMMARY OF THE INVENTION

The present invention has provided a guidance system for guiding mobile vehicles along a traffic layout having a plurality of interconnected traffic paths defined by a path defining means. By way of example, the path defining means may comprise conductors disposed in the floor over which the vehicles travel, the conductors being energized to radiate electromagnetic guidance signals. The electromagnetic guidance signals are detectable by guidance sensor means carried by the vehicle. In accordance with the invention, each vehicle includes a control means carried by the vehicle, the control means including programming means which is selectively operable to select any one of a plurality of stations along the traffic layout as a destination for the vehicle and to cause the vehicle to be guided to such station by way of the most direct and shortest route thereto.

Code devices disposed at various locations along the traffic layout, including the locations of each station, divide the traffic layout into sections or blocking zones, and provide a unique identifying code for each blocking zone. The codes are sensed by the vehicle control means as the vehicle passes adjacent to the code devices, enabling the control means to determine the location of the vehicle along the traffic layout and to halt the vehicle when it reaches its designated station.

In accordance with the invention, as each vehicle travels along the traffice layout towards the station designated by its programmer means, a transmitter means of the control means is enabled periodically to transmit a position signal indicative of the location of the vehicle, and a receiver means of the control means receives position signal transmissions from all of the other vehicles. The control means uses the received information to determine the location of the vehicle relative to other vehicles, and to maintain a minimum safety distance between the vehicles. Whenever a vehicle comes to within the minimum safety distance of a second vehicle, the first vehicle is halted.

More specifically, upon entering each blocking zone, the control means detects the code provided by the code device and assumes such code as a present address for the vehicle. The control means uses the present address along with the position signals received from other vehicles to maintain the minimum spacing between vehicles. Also, each vehicle uses its previous present address, or past address, in effecting the transmission of its position signal.

The position signals of all of the vehicles are transmitted periodically in a time divided fashion. Each transmission cycle is subdivided into a plurality of time slots, and each code device, and correspondingly each present and past address, has a different assigned time slot. The control means for each vehicle includes time slot generating means each operating synchronously with one another under the control of synchronizing signals from a common source, which for example may comprise a central control unit, to provide timing signals defining the time slots to enable the vehicle position signal to be transmitted during the time slot corresponding to the past address for the vehicle, and to enable the vehicle control circuits to respond to a position signal transmitted by another vehicle in the time slot corresponding to the present address for the vehicle to halt the vehicle.

At diverging points, where secondary paths intersect with the main path, the code devices provide a code which indicates that one or more bypass paths are available, enabling the vehicle to be directed along one of the bypass paths in the event the preferred path is occupied by another vehicle. Also, at converging points, the code devices provide a code which instructs the vehicle control circuits to "listen" for positions signals transmitted by vehicles moving toward the converging point along a parallel path, permitting a vehicle to be halted whenever a further vehicle is closer to such converging point.

In accordance with a disclosed embodiment, the control means for each vehicle includes sensor means which senses the codes provided by the code devices and provides control outputs to the programmer means which generates heading commands for the vehicle drive and guidance circuits. The control means further includes first memory means which stores "present address" data supplied thereto by the sensor means, and which corresponds to the identification of the block in which the vehicle is presently traveling, and second memory means which stores "past address" data supplied thereto from the first memory means, and which corresponds to the block in which the vehicle was just previously traveling.

A first comparator means of the control circuits responds to the present address data and to timing outputs of the time slot generating means to enable control logic means to halt the vehicle whenever a position signals is received via the receiver means from another vehicle during the time slot assigned to the present address. Bypass logic means of the vehicle control means responds to the code, provided by code devices at diverging points to override the control logic means to prevent halting of the vehicle if an unoccupied bypass path is available.

A second comparator means responds to the past address data and to timing outputs of the time slot generating means to cause the control logic means to enable the transmitter means to transmit the position signal for the vehicle. The position signals are coupled to the guide conductor means and transmitted thereover to all of the other vehicles traveling along the traffic layout.

Thus, in the system of the present invention each vehicle maintains a predetermined safe distance between the vehicle and other vehicles traveling behind the vehicle by periodically transmitting a position or blocking signal during a preassigned time slot indicative of the position of the vehicle along the traffic layout. Any other vehicle, upon entering the block identified by the coding corresponding to such time slot is halted unless an unoccupied by pass path is available. The use of "past address" transmission and "present address" detection assures that at least a one blocking zone separation is maintained between vehicles. Also, the use of time division techniques for transmitting the position information, simplifies the use of the guidance conductors as a transmission medium between vehicles, and between vehicles and a central control. Further, the use of the time division technique and the assignment of a different time slot to each blocking zone, readily enables the addition or deletion of stations or blocking zones with minimal changes in the vehicle control circuits making the system readily adaptible for use in systems requiring a large or small number of stations and/or vehicles.

Moreover, as described in more detail hereinafter, in the exemplary embodiment wherein the code devices comprise variably polarized magnets arranged to provide a two row code, only one or two magnets are generally required in each row to provide the coding necessary to afford unique identification of each station and each converging or diverging point, as well as the necessary command input to the vehicle programmer and control circuits for effecting stops, turns, bypass and converging operations.

DESCRIPTION OF THE DRAWINGS

FIG. 1 is a simplified layout diagram illustrating a traffic layout of the guidance system of the present invention;

FIG. 2 is a schematic representation of the layout of the location identification devices along the traffic layout of FIG. 1;

FIG. 2A illustrates the configuration of the point identification devices;

DESCRIPTION OF A PREFERRED EMBODIMENT

General Description

Figure 3:
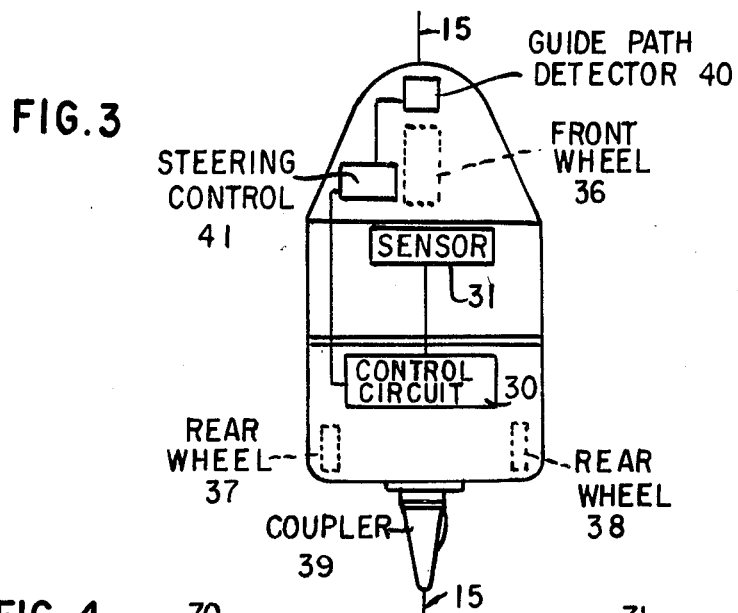
FIG. 3 is a plan view of a mobile vehicle for use in the guidance system of the present invention.

As shown in simplified fashion in FIG. 1, the traffic layout of the vehicle guidance system of the invention is generally formed by a pair of guide wires 15 and 16 laid down in a pattern to define main and secondary paths of the system. In FIG. 1, the main traffic path is defined by guide wire 15, indicated by the solid line, which extends in a continuous loop and which is energized by a signal at a first frequency f1 provided by an oscillator 25. The other guide wire 16 defines three secondary traffic paths, depicted in dashed lines designated by reference numerals 16A-16C. The secondary paths intersect with the main path at points 17-22, and are interconnected with one another by lines 16', indicated by dot-dashed line, to form a further continuous non-guidance loop which is energized by a signal at a second frequency f2 provided by an oscillator 24.

A number of typical stations or locations on the layout are referenced by numerals 1-12. As will be made clear herein, after a truck or other mobile vehicle is directed to proceed to a preselected station, such truck selects the shortest route in proceeding to the station, and therefore the points 17, 19 and 20, at each of which one of the secondary paths diverges from the main path, are denominated "decision points". When a vehicle approaches any of these points in its travel to a preselected station, control circuits carried by the vehicle determine whether to maintain the vehicle on the main path, or to depart and travel over the secondary path in traversing the preferred route, or shortest distance, to the station. The control circuits 30, shown in FIG. 4, include a programmer 77 having associated select switches 77A which are manually actuable by an operator to "instruct" the vehicle to proceed toward and stop at a predetermined station, and to take the shortest route to the designated station. The vehicle further includes a guide path detector 40, shown in FIG. 3, which is controllable to selectively respond to the guidance signals f1 or f2 to cause the vehicle to travel along the main or secondary path as will be shown hereinafter.

It is pointed out that although only twelve stations are depicted in the drawings to indicate the mode of operation of the guidance system, as many as fifty stations can be provided with the disclosed structure. Further, the illustrated traffic layout has been greatly simplified for purposes of this description, in a typical application, the traffic layout would include a larger number of secondary paths and decision points, and more than two guidance frequencies may be used, as necessary to satisfy system requirements.

With reference to the traffic layout of FIG. 1, a vehicle 35 is shown located adjacent to station 9. As the vehicle 35 travels along the traffic layout, its associated control circuits 30 periodically transmit a position signal indicative of the location of the vehicle, and thus of a state of occupancy of a given block which may indicate the block the vehicle is in or the block it has just left, and receive the position signal transmissions from all of the other vehicles, such as vehicle 35' shown adjacent to station 10. The control circuits 30 use the received information to determine the location of other vehicles ahead of the vehicle 35 relative to the vehicle 35, and to maintain a minimum safety distance between vehicles. Whenever the vehicle 35 comes to within the minimum safety distance of a second vehicle, the control circuits 30 are effective to disable the propulsion means of the vehicle 35 to stop the vehicle until the second vehicle moves ahead sufficiently that its position signal indicates it is safe for the vehicle 35 to continue its travel along the traffic layout.

It is pointed out that should the vehicle 35 be at one of the decision points 17, 19 or 20 when a "halt condition" occurs, then the control circuits will determine whether the vehicle can bypass the congested path by taking an alternative route rather than halting the vehicle. If, however, the further route is also congested, then the vehicle will be stopped. The operation of the control circuits in providing halt and bypass operations will be described in more detail hereinafter.

For the purpose of enabling the control circuits 30 to determine the location of the vehicle, location identification or code devices are provided at various points along the traffic layout, including the locations of the stations 1-12 and at the points 17-22 where the secondary paths 16A-16C interconnect with the main path 15.

The locations of the code devices on the traffic layout is illustrated in FIG. 2. The code devices for each of these stations are represented by a pair of circles, such as circles 51 which represent the code device associated with station 9. At each decision point, such as decision point 17, the code device is represented by a large circle 52, the code device instructing the vehicle control circuits to be responsive to guidance signals at either frequency f1 or frequency f2 depending upon whether the vehicle is to travel on the main path 15 or to turn onto the secondary path 16A.

The code device at each converging point, such as point 18, as represented by a solid circle 53, instructs the control circuits to set the guide path detector to be responsive to frequency f1. In addition, prior to each converging point, such as converging point 18, there is provide a code device 54 in each of the paths which converge at such point, to indicate to the control circuits that the vehicle is approaching a point of convergence. For example, code device 54, represented by solid diamonds, provide a converging code which is detectable by a vehicle traveling along path 16A to indicate to such vehicle that a converging point is being approached. The converging codes enable a vehicle traveling along path 16A, for example, to be halted if a further vehicle traveling along path 15 toward convergence point 18 is closer to the convergence point than is the vehicle traveling on the path 16A. Further code devices, such as code device 58 represented by a diamond outline, provide "blocking codes" to effect halting of a vehicle at points intermediate stations and points intermediate a station and a decision point.

In general, each of the code devices provides a unique coding which is sensed by sensors 31 (FIG. 3) on the vehicle, as the vehicle moves along the traffic layout. The sensors respond to the coding provided by such code devices as the vehicle passes over the code devices to provide location identification data to the control circuits 30 for enabling the control circuits to determine the location of the vehicle and to transmit a position signal indicative of the location of the vehicle. In addition, the control circuits via its programmer 77, respond to the coding of the station which is the designated destination for the vehicle to halt the vehicle at such station.

At diverging points, such as point 17, the coding provided by its code device 52 both identifies point 17 and indicates that such point is a decision point. Thus, the code indicates that the control circuits must decide whether the vehicle is to continue traveling along the main path 15 or turn onto the secondary path 16A. Such selection is effected by the control circuits in accordance with the destination of the vehicle and the presence (or lack thereof) of a further vehicle traveling on either path 16A or 15 beyond point 17. Thus, consideration is given to the existence of traffic ahead, and for certain conditions, an override of a "turn command" may be effected.

At converging points, such as point 18, the coding provided by converging code device 54 permits the control circuits to determine not only whether there is a further vehicle traveling along 16A ahead of the first vehicle, but also if there is a vehicle traveling along the main path 15 toward the converging point 18, if such vehicle has reached or already passed converging code device 54' which is located on the main path 15. That is, the convergence code provided by coding device 54 enables a vehicle passing over such code device to be halted in response to the receipt of a position signal provided by a vehicle traveling along either path 16A or 15.

The code devices divide the traffic layout into a plurality of blocks comprising preassigned lengths of the main and secondary paths. For example, code device 51 at station 9 and code device 52 at decision point 17, define a block 61, code device 52 and code device 57 at station 1 define a block 62, and code device 52 and code device 58 define a block 64, etc. The codes provided by code devices 51, 52, and 57, as well as those provided by code devices 58, are referred to as "blocking code" inasmuchas such codes when sensed by a given vehicle are used to effect the generation and transmission of a position or blocking signal by such vehicle to halt a further vehicle which is following too closely to the first vehicle. For example, vehicle 35' shown approaching station 10, prevents a further vehicle, such as vehicle 35, from entering block 64 by transmitting a position or blocking signal which indicates that a vehicle, vehicle 35' in this example, has just left block 64 and is now traveling in the next block, that is, block 65. The vehicle 35' does not identify itself, but merely indicates that a vehicle has just left block 64.

Once the vehicle 35' has reached station 10, and detected the code provided by its code device 59, the blocking signal transmitted by vehicle 35' is modified so as to permit a further vehicle to enter block 64 but to prevent such vehicle from entering block 65, defined by code devices 58 and 59, until the first vehicle in its travel reaches the converging code device 54 and has thus moved out of the block 66 defined by the code device 59 at station 10 and the converging code device 54.

It is pointed out that certain of the code devices, such as code device 53 at convergence point 18, which has a horizontal line drawn therethrough, provide a "non-blocking" code which permits a vehicle to continue to travel into the next block. The "blocking zone" at convergence point 18 is defined by code device 55 and code device 67 at station 3. Such non-blocking codes are generally provided at converging points, such as points 18, 21, and 22, so that a vehicle is not halted at such points. However, non-blocking codes may also be provided by certain stations, such as station 8.

The codings provided by the code devices may be considered as an "address" for the vehicle. That is, vehicle 35 which is illustrated as traveling in block 61 defined by code devices 51 and 52 has a "present address" which corresponds to the coding provided by code device 51 at station 9. The "past address" for the vehicle 35 corresponds to the coding provided by code device 49 which is the last code device passed by the vehicle 35 prior to reaching station 9. Each vehicle transmits a signal representing its "past address" and "listens" for position identification signals transmitted by other vehicles which correspond to its "present address". When a position or blocking signal corresponding to the present address of the vehicle is received, the vehicle is halted.

Summarily, each vehicle periodically transmits a signal representing its "past address" and "listens" for blocking signal corresponding to its "present address". The receipt of a blocking signal from another vehicle will cause the first vehicle to be halted, unless an uncongested bypass path is available. At diverging points, the coding afforded by the code devices thereat enables the vehicle control circuits via its programmer to select the shortest route for the vehicle to its intended destination. At converging locations, the converging codes provided by the code devices provided thereat enable the vehicle to determine the presence of other vehicles either directly ahead of the first vehicle on the same path or traveling along parallel paths extending to the convergence point. In either case, the vehicle is halted more than a block behind a preceeding vehicle thereby maintaining a minimum safety distance between vehicles moving along the traffic layout.

Central Control Unit

Referring again to FIG. 1, the position signals provided by the vehicle 35, for example, are coupled to the guide wires 15 and transmitted thereover to all of the other vehicles traveling along the main path of the traffic layout. In addition, the position signals are detected by a receiver 26, of a unit 28 which also includes oscillator driver circuits 24 and 25. The receiver 26 controls the modulator 29A which repeats the position signals and couples the repeated signals to guide wire 15 as well as to guide wire 16 through oscillators 25 and 24. Similarily, receiver 27 detects position signals on guide wire 16 and controls modulator 29A which provides amplified signals to guide wires 15 and 16 by way of oscillators 25 and 24. It is apparant that passive filters can be used in place of repeaters 26 and 27 to couple position signals between the guide wires.

The central control unit 28 also synchronizes the operation of the control circuits of the vehicles. That is, the central control unit 28 includes a synchronizing signal generator 29 which generates a synchronizing signal at a predetermined period, such as 640 ms, drives the modulator 29A, sending modulator signals to the oscillators 24 and 25 to cause the sync signal to be transmitted over the guide 15 and 16 for detection by the control circuits of each of the vehicles. The manner in which the synchronizing signal is effective in synchronizing the operation of the control circuits for all of the vehicles is described below with reference to the description of the control circuits. It is pointed out that while in the preferred embodiment, the synchronizing signal generator 29 is provided at a central location, a suitable synchronizing signal generator may be carried by one of the mobile vehicles traveling over the traffic layout.

Vehicle Control Circuits

Figure 4:
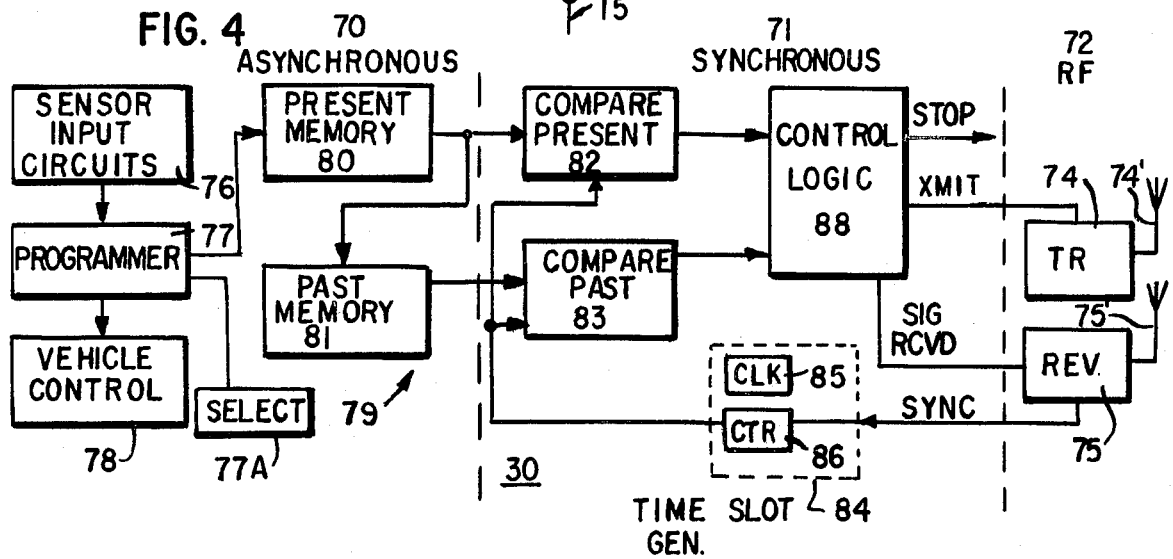
FIG. 4 is a simplified block diagram of control circuits for the vehicle shown in FIG. 3.

The control circuits 30 for the vehicle are shown in block diagram form in FIG. 4. The control circuits 30 comprise an asynchronous section 70, a synchronous section 71, and an RF section 72. The asynchronous section 70 includes sensor input circuits 76, the programmer 77, vehicle control circuits 78 and memory circuits 79 including a present address memory 80 and a past address memory 81. These circuits receive and store the block identification information detected by the sensors 31 to provide heading information for vehicle, and also provide data to circuits of the asychronous section 70 for blocking purposes.

The synchronous section 71 includes past and present address compare circuits 82 and 83, a time slot generator 84 and control logic 88. The synchronous circuits use the location identification data provided by the asynchronous circuits and the sync signals provided by the central control unit 28 to effect the transmission of the position signals for the vehicle by way of transmitter 74 of the RF section 72, and to effect halting of the vehicle by way of vehicle control circuits 78 in response to a position or blocking signal rreceived from another vehicle.

The RF section 72 includes transmitter 74 and a receiver 75. The receiver 75 receives the synchronizing signals transmitted by the central control and the position signals transmitted by the other vehicles and extends such signals to the synchronous circuits 71. The transmitter 74 responds to a control output of the synchronous circuits to transmit the position signals for the vehicle. The transmitter 74 may also be used to transmit special request data to the central control.

More specifically, with reference to the asynchronous circuits, sensor input and decoder circuits 76 respond to inputs provided by the sensors 31 representing the identification coding provided by the code devices, and provide location identification and common signals to programmer 77. The programmer 77 basically comprises a diode matrix or other means which decodes the location information in accordance with settings of the select switches 77A and provides control outputs to vehicle control circuits 78 to effect change in the frequency at points of convergence or divergence for directing the vehicle along the designated or proper route to the designated station. The programmer 77 also provides an output for halting the vehicle when the designated station is reached. The outputs of the programmer 77 are supplied to the memory circuits 79. The present address memory 80 stores sensed data representing the "present address" or current location of the vehicle along the traffic layout.

As the vehicle travels along the traffic layout and enters the next block, the data stored in the present address memory 80 is transferred to a past address memory 81 as a "past address" for the vehicle, and new data, respresenting the identification of the further block, that is, the present address is supplied to the present memory 80. Thus, data representing the identification of the block in which the vehicle is presently traveling is stored in the memory 80 and further data representing the identification of the block in which the vehicle was previously traveling is stored in the past memory 81. The information stored in the present memory 80 and the past memory 81 is used by the synchronous circuits for enabling the vehicle to transmit its position signal and also for enabling the vehicle to be halted when it approaches too close to a further vehicle.

Referring to the synchronous circuits 71, the information stored in the present memory 80 is supplied to a present compare circuit 82 which receives a timing input from a time slot generator 84, the operation of which is synchronized by the synchronizing signal provided by the central control unit 28 and transmitted over the guide wires 15 and 16. Similarily, the data stores in the past memory 81 is supplied to a past compare circuit 83 which also receives the timing input provided by the time slot generator 84.

The time slot generator 84 comprises a clock pulse generator 85 which is operable when enabled to provide a series of clock pulses at a predetermined rate, and a counter 86 which counts the pulses to define a plurality of time slots defined by successive states of the counter. Each identification point of the traffic layout is assigned a different time slot, and the codes provided by the code devices each indicate its assigned time slot. The present compare circuit 82 provides an output to control logic 88 during the time slot assigned to the identification point indicated by the data stored in the present memory 80. The control logic responds to such output to halt the vehicle whenever a blocking signal is received from another vehicle during that time slot.

The past compare circuit 83 is enabled to provide an output during the time slot represented by the coding of the data stored in the past memory 81, indicative of the block in which the vehicle was just previously traveling. The output of the past comparator circuit 83 is supplied to the control logic 88 which enbles the transmitter 74 of the Rf circuits to transmit a position signal indicative of the location of the vehicle. That is, the transmitter is enabled during the time slot corresponding to the "past address" of the vehicle to transmit its blocking signal, such signal being transmitted over the guide wires to the other vehicles traveling over the traffic layout.

As indicated above, in the exemplary embodiment, the synchronization of the guidance system is effected by synchronizing signals provided by the central control. The Sync Signal comprises an initial 16 millisecond "high" pulse followed by a one millisecond "low" pulse and another one millisecond "high" pulse. The frame begins at the beginning of the one millisecond high pulse. The frame timing is defined as the total time between the synchronizing points of the system. This frame includes the preamble 16 bit and the one millisecond low pulse of the sync signal, before the frame begins or ends, and the one millisecond high pulse after the frame starts. The frame extends beyond the last block number and includes the entirety of the sync signal.

Figure 5:
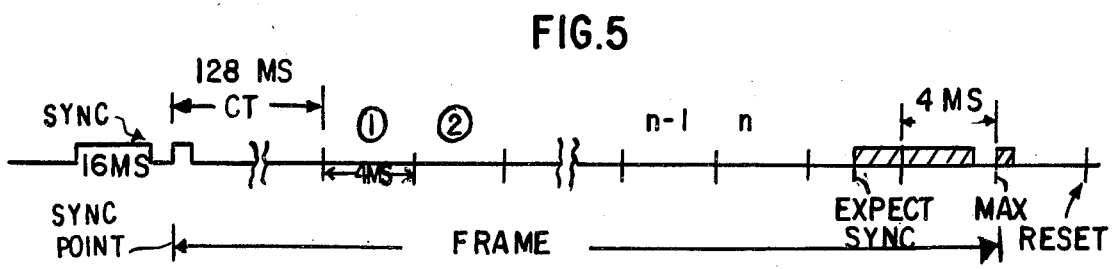
FIGS. 5 and 5A are timing diagrams for the guidance system.

Each synchronizing signal defines the start of a frame which, as shown in FIG. 5, includes a communication time of 128 milliseconds and N time slots, each 4 milliseconds long. A separate time slot is provided for each block. During the communication time, the vehicles can effect a special data request, transmitting information to the central control. In normal blocking, each vehicle transmits a signal every time its past address equals the current time slot. In addition, whenever its present address equals the current time slot, the vehicle is stopped if a position or blocking signal is received from another vehicle, indicating that the vehicle is about to enter a block just previously occupied by the other vehicle.

Figure 5A:
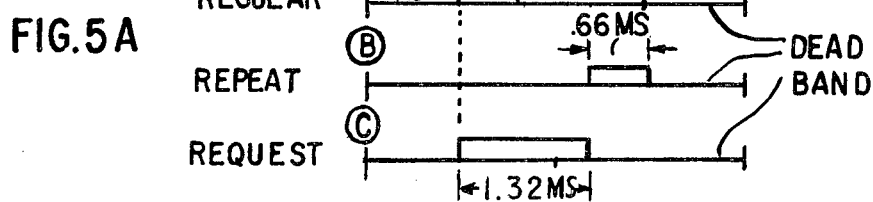

With reference to FIG. 5A, which is an expanded view of a given time slot, it is seen that each time slot is subdivided into four, one millisecond portions. The vehicle position signals, which are approximately 0.66 milliseconds in duration, are transmitted during the second portion of the proper time slot (line A), and when central control repeat is used, such "repeated" signals are transmitted during an 0.66 millisecond portion of the third portion of the time slots (line B). The first and fourth positions provide deadbands between time slots. Special request information is transmitted during the second and third portions of a time slot as indicated on line C.

The sync signals and blocking signals transmitted over the guide wires are detected by the receiver 75 which has a receiving antenna 75' mounted on the vehicle to be in close proximity to the guide wire. The receiver detects the sync signal and incoming pulses equal to or greater than 0.66 millisecond in duration, which corresponds to a blocking signal from another tractor and repeat signals, and provide logic level signals to the time slot generator 84 and control logic 88.

The transmitter 74 responds to a logic level control input provided by the control logic 88 to provide a 50 KHZ blocking signal which is coupled to the guide wire by way of an antenna 74' of the transmitter.

Operation

Referring to FIGS. 2 and 4, for purposes of illustration, it is assumed that the guided vehicle, such as a truck or a tractor, is stopped at station 9 and that the selector switches 77A on the vehicle are then manually operated to insert command information for such vehicle to start up and travel over the shortest route to station 3 and to halt at station 3. The actual energization of the vehicle propulsion means, which may be an electric motor, is not shown, but completion of such circuit by a separate switch or by a switch ganged to the selector switches may be used.

Initially, the past address for vehicle 35 corresponds to the code provided by code device 49 and its present address corresponds to the coding of code device 51 at station 9, and data corresponding to the codes provided by code devices 51 and 49 is stored in memory circuits 80 and 81, respectively, and supplied to the present and past compare circuits 82 and 83. Also, as shown in FIG. 2, a further vehicle 35' is traveling in a block 65 defined by code devices 58 and 59, such vehicle having a past address corresponding to the coding provided by code device 52.

As vehicle 35 moves along block 61, its receiver 75 responds to each sync pulse transmitted over the guide lines by the central control unit 28 to enable the time slot generator 84. This causes the counter 86 to be reset to zero and enables the clock 85 to generate timing pulses. The counter 86 counts the timing pulses and supplies inputs to the present compare circuit 82 and past compare circuit 83 indicative of the state of the counter. Each time the counter 86 reaches a count corresponding to the time slot assigned to code device 49, and thus the past address for the vehicle, the past compare circuit 83 is enabled providing an output to the control logic 88 which causes the transmitter to transmit a position signal during such time slot. Also, when the counter reaches a count corresponding to the coding for code device 51, the present compare circuit 82 is enabled to provide an output to the control logic 88. In the exemplary embodiment, since no further vehicles are traveling in the blocks 62 and 64 just beyond the block 61 in which vehicle 35 is traveling, the control logic 88 does not respond to the output of the present compare circuit 82.

When the vehicle 35 reaches code device 52, the input sensors 31 read the code information provided by code device 52 as the vehicle passes over the code device. The new present position information provided by the coding of such device is supplied to the programmer 77 which responds to the signals to initiate a change from frequency f1 to frequency f2 to cause vehicle 35 to turn onto path 16A which is the shortest route its designated station 3. If, on the one hand, vehicle 35' has not yet reached code device 59, then its past address corresponds to the coding of code device 52 and it transmits a blocking signal during the time slot assigned to code device 52. For such condition, the control logic 88 of vehicle 35 responds to such blocking signal and the output of the present compare circuit 82 to initiate a bypass operation, defeating the turn to maintain the vehicle 35 traveling along the main route.

On the other hand, if vehicle 35' has reached code 59, then its present address becomes the coding for device 59 and its past address is dictated by the coding for device 58. At such time, the control circuits for vehicle 35' will respond to each sync signal to transmit its blocking signal during the time slot assigned to code device 58. Accordingly, vehicle 35 will be permitted to turn on to path 16A and continue on traveling towards its designated station as long as vehicle 35' remains more than one block ahead of the vehicle 35.

Assuming vehicle 35' does continue moving along the traffic layout, maintaining the proper spacing between such vehicle and vehicle 35, then as vehicle 35 continues along path 16A and passes code device 58, its present and past addresses are changed to correspond to the coding for devices 58 and 52 respectively.

When vehicle 35 reaches the converging code device 54, its present address is changed to the coding for the time slot assigned to code device 54. In the convergence mode, the past address is "expanded" electronically, enabling the vehicle to "listen" for blocking signals provided by vehicles traveling over all paths leading to the converging point. That is, during such time slot in the next frame of time slots, the control logic 88 responds to the converging code to enable the control logic to be enabled by position signals received during the time slot which is assigned to coding device 54, which is disposed along path 16A as well as to code device 54' which is disposed along the main path 15. If any other vehicle has a past address corresponding to the coding for devices 54 or 54', (or for code devices 55 or 55' as the vehicle continues moving along the path 16A), the vehicle 35 will be halted.

In the absence of blocking signals, the vehicle continues its movement along path 16A to converging point 18. When the vehicle 35 reaches point 18, the set frequency code provided by the code device 53 at such point causes the vehicle control circuits 78 to change from frequency f2 to f1 causing the vehicle to turn on to the main path 15. Also, since code device 53 provides a non-blocking code, the past and present addresses of the vehicle 35 are unchanged from the coding of respective code devices 54 and 55.

The vehicle 35 then continues to travel along the main path until the vehicle passes over the code device 67 which identifies station 3, the programmer 77 responding to such code to halt the vehicle.

Mobile Vehicle

Referring to FIG. 3, there is shown a plan view of a vehicle 35 shown following a course defined by signals radiated from guide wire 15. Such vehicle may include a front drive and steering wheel 36, left and right rear wheels 37 and 38 respectively, and a coupler 39 attached to the rear of the vehicle. The vehicle 35 further includes a guide path detector 40 which responds to the signals at frequency f1 conducted over the guide wire 15 to provide control outputs to a steering control unit 41 which controls the front wheel 36 to maintain the vehicle traveling along the guide path defined by conductor 15. The control circuits 30 for the vehicle 35 respond to inputs provided by sensors 31 indicative of the location of the vehicle along the traffic layout to provide further control outputs to the guide path detector 40 and the steering control unit 41 in a manner to be described.

The guide path detector 40 and steering control unit 41 may be similar to those disclosed in the DeLiban U.S. Pat. No. 3,009,525, and accordingly will not be described in detail herein.

Briefly, as mentioned above, each mobile vehicle follows a path defined by signals radiated from guide wires or conductors 15 and 16 which, for example, may be insulated wire disposed beneath the floor of the factory or warehouse in which the vehicles are driven. In the exemplary embodiment, guide wire 15, which defines the main path around the layout, radiates electromagnetic signals at a frequency f1, which may be 2 KHZ, and conductor portions 16A–16C, which define the three secondary paths, radiate electromagnetic signals at a frequency f2, which may be 2.2 KHZ. By adjusting the effective electrical values of the components in the guide path detector 40 of the truck, the guide path detector is rendered sensitive substantially only to signals of either frequency f1 or 2, and thus causes the mobile vehicle to follow either the main path or a secondary path as it passes a decision point. Such adjustment is effected in response to signals provided by the programmer 77 and vehicle control when the vehicle passes over the code device at a decision point. Also, at return points 18, 21, and 22, where the secondary paths rejoin the main path, the programmer 77 via vehicle control 78 cause the path detector to be rendered insensitive to signals at frequency f2 and to be sensitive to signals at frequency f1. The manner in which the vehicle steering control circuits 41 and guide path detector 40 respond to control inputs to determine vehicle heading is described in DeLiban patents referenced above.

The actual energization of the guide wires to emit electromagnetic signals will not be described, such technique being manifest from the above-cited DeLiban Patents. It is sufficient to note that oscillator 25 provides signals of a first frequency f1, which may be 2 KHZ, to the main path 15, and oscillator 24 provides signals of a different frequency f2, such as 2.2 KHZ, to each of the secondary paths 16A, 16B, and 16C. The insulated wires which comprise the guide wires insulate the f1 and f2 signals from each other as far as guidance and control at decision points and converging points.

Code Devices

In the exemplary embodiment, the code devices comprise variably polarized magnets embedded in the floor and disposed adjacent to the guide wires 15 and 16 at each of the identified locations. Each code device comprises two or more magnets polarized for either north or south polarity, the magnets being positioned in two or more rows and in preselected positions of each row to define the unique codings for each position.

Referring to FIG. 2A, there is shown a schematic representation of possible placements for coding magnets in first and second rows. Each row has four magnet positions which may locate a magnet having either a north or a south polarity thus defining eight line numbers. Each code device comprises two, three or four magnets, there being at least one magnet in each of the rows one and two. For example, the coding for one of the stations may comprise a first magnet having a north pole located in position one of row one, and a further magnet having a north pole located in position one of row two. The four magnet positions of row one are aligned with the corresponding magnet positions in row two, and the center lines of the two rows are spaced apart a distance of approximately twelve inches. The spacing between adjacent magnet positions in each row may for example be approximately eight inches.

The sensors 31 (FIG. 3) which sense the floor code provided by the magnetic devices may, for example comprise four pairs of reed switches (not shown) which are mounted in side by side relationship and spaced apart as to be influenced by only one of the magnets in a given row. By way of example, each reed switch may include normally closed contacts which are operable under the influence of the magnets in row one and row two as the vehicle passes thereover to open associated contacts, providing a set of coded signals over eight sensor output lines indicating the coding of the magnetic code devices,

Code Assignments

As indicated above, in general each code device provides a unique coding which identifies the location of the device. In addition, the coding provides information for use by the vehicle control circuits 30 in effecting vehicle control, such information including identification of converging and diverging points, availability of bypass paths, and instructions to change frequency. The row one codes, which provide the most significant byte of information to the programming, provide decode information for stops, frequency changes and blocking purposes, turns lists signals, station digits for programming and blocking, indicating the type of operation. The row two codes, which provide the least significant byte of information to the programming, augment the first row codes by defining the station or stations number indicating the location of the vehicle, or which turn it is at.

The row one codes versus the type of code indicated are summarized in Table I. In Table I, the numerals 1–4 refer to the magnet position, and the letters N, S refer to the polarity of the magnet. The codes listed and Table I may be easily changed to accommodate different system requirements.

TABLE I

| Position/Polarity | Code Type |
|---|---|
| 1N; 1S; 2N; 2S | Station Codes - Blocking |
| 3N; 1S + 3S | Station Codes - Non blocking |
| 3S | Bypass N = 1 (1 alternate path) |
| 4N | Bypass N ≦ 3 (three or less alt. paths) |
| 4S; 2N + 3N | Convergence Code |
| 1N + 3N | Turns: F1 to F2 |
| 1S + 3N | Turns: F2 to F1 |
| 2S + 3N; 1N + 3S | F1 to F2 and F2 to F1 turns respectively inside N ≦ 3 zones |
| 1S + 3S | Short Bypass Turn |

Thus for example, as shown in Table I, first row codes for stations with blocking are represented by a magnet with a north pole positioned at either line number 1 or line number 3, or by a magnet with a south pole positioned at line number 2 or line number 4. Non-blocking station codes are represented by a north pole magnet at line position 5, or by a south pole magnet at line position 2 and a south pole magnet at line position 6.

DETAILED DESCRIPTION OF VEHICLE CONTROL CIRCUITS

Asynchronous Circuits

Figure 6:
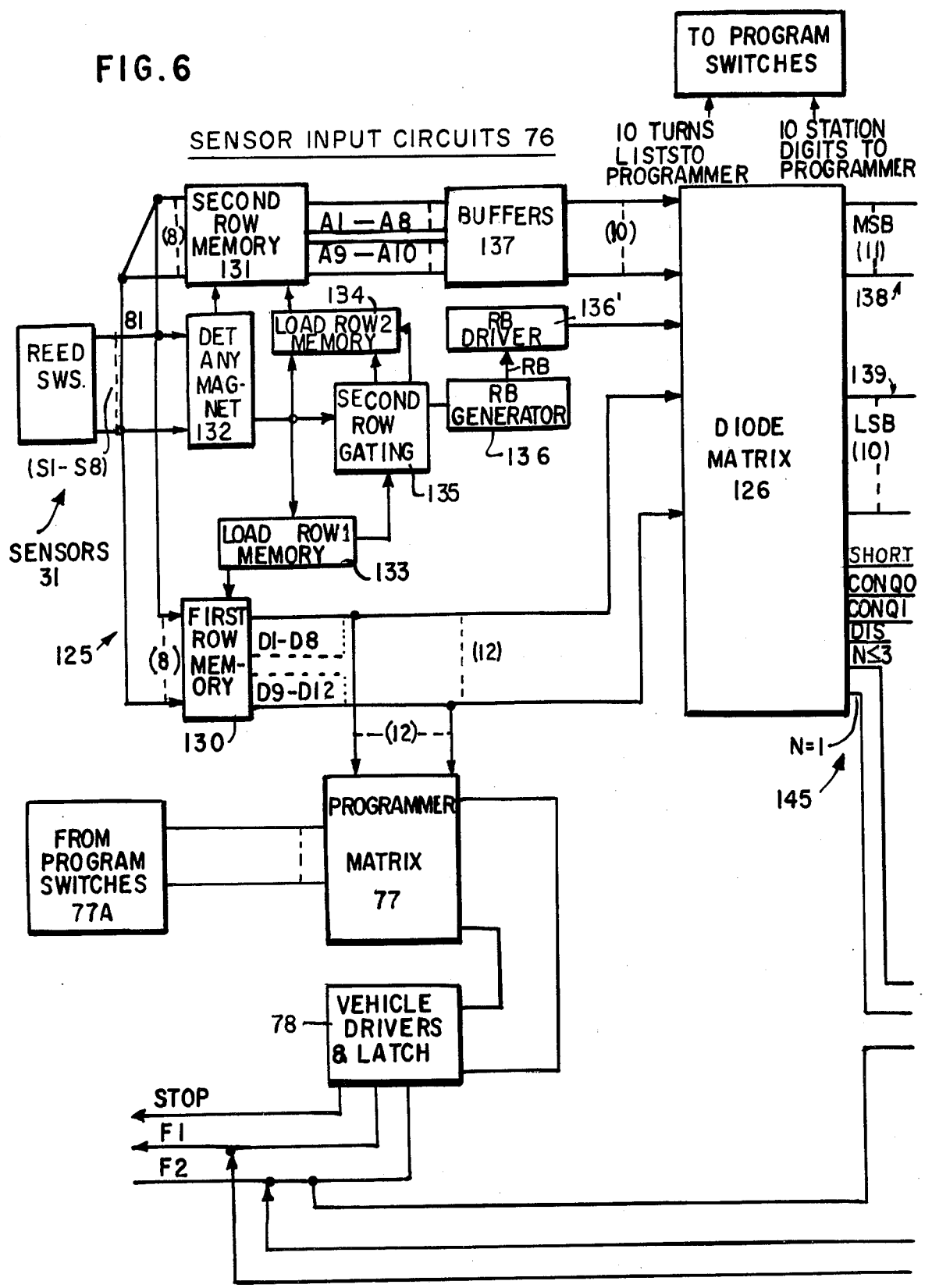
FIGS. 6 and 6A, when arranged in side-by-side relation, provide a simplified and partial block diagram of asynchronous circuits of the vehicle control circuits.
Figure 6A:
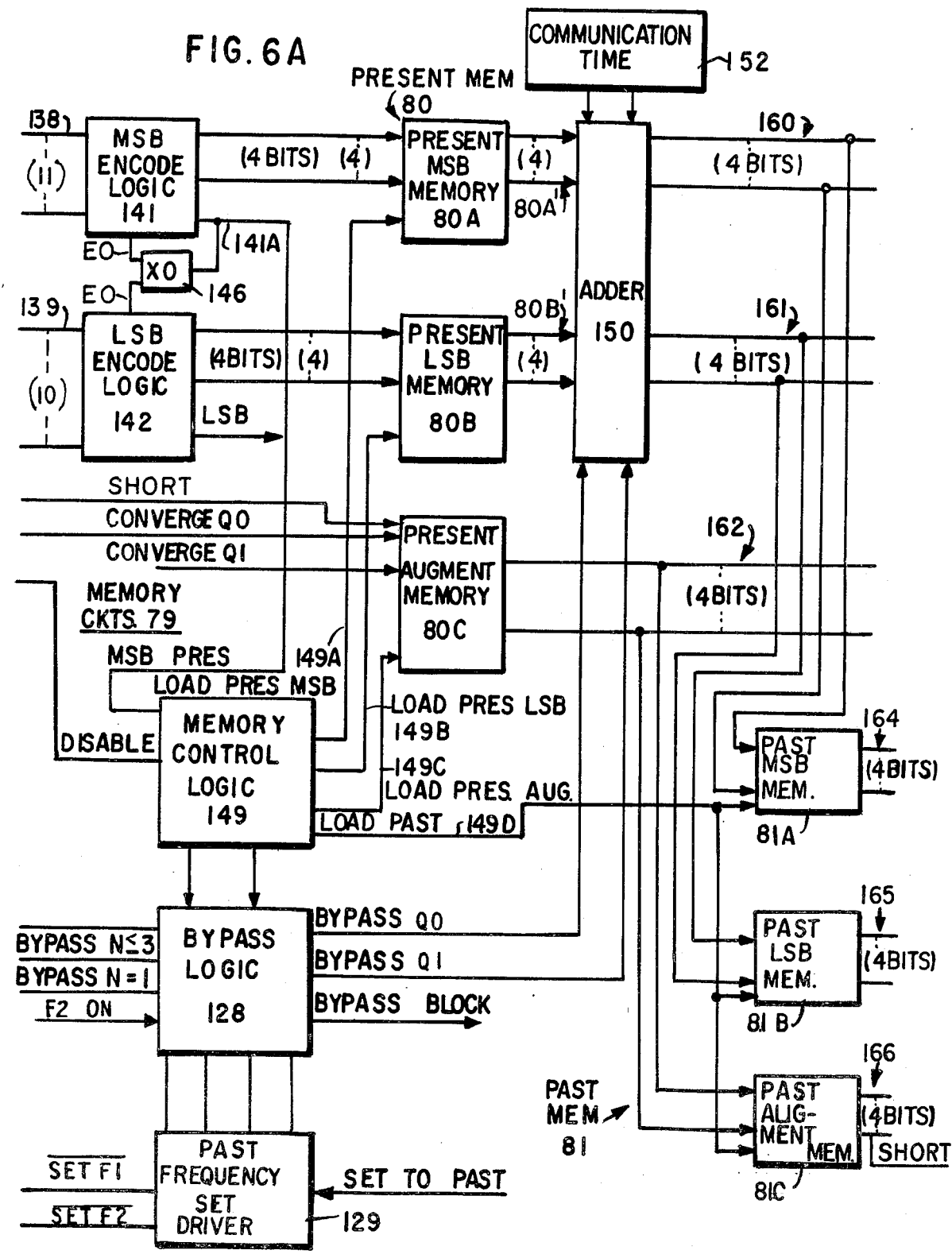

FIGS. 6 and 6A when arranged in side by side relation provide a more detailed showing of the asynchronous circuits. With reference to FIG. 6, the sensor input and decoder circuits 76 include temporary storage circuits indicated generally at 125 which receive and store the position identification information detected by the reed switch sensors 31 and provide signals representing the detected code to the programmer 77 and to a diode matrix 126 which decodes the sensed information to provide signal outputs in a format suitable for use by the programmer 77 and the memory circuits 79 shown in FIG. 6A. As indicated above, the programmer 77 comprises a diode matrix, which decodes signals supplied thereto to control the vehicle drivers and latch circuits 78 which provide outputs for stops, frequency changes, etc.

The eight line outputs S1–S8 of the read switches 31 are commonly connected to inputs of a first row memory 130, a second row memory 131 and a detector circuit 132 which comprise the temporary storage circuits 125. The detector circuit 132 responds to the detection of any magnet, as represented, for example, by the opening of normally closed contacts of the reed switches, to provide a load enable signal to a row one load circuit 133 and to a row two load memory circuit 134, the load enable signal not being effective for the row two load memory circuit 134 until a further signal provided by a second row gating circuit 135 is provided. The second row gating circuit 135 responds to outputs of the detector circuit 132 and the row one load memory circuit 133 to cause the row two load memory circuit to load the second row data into the second row memory 131.

The first row memory 130 delivers logic level signals over lines D1–D12 to the programmer diode matrix used for control of the vehicle, and to the diode matrix 126 where the signals are decoded into eleven discrete most significant bit (MSB) output lines indicated generally at 138. The information stored in the second row memory 131 provided on lines A1–A10 is extended over buffers 137 to the diode matrix 126 where it is decoded into ten discrete least significant bit output lines (LSB) indicated generally at 139.

When the reed switches close, as the result of moving past the second row code magnet or magnets, the detector circuit 132 via second row gating circuit 135 enables a signal generator 136 which provides a signal RB which is extended via a driver circuit 136' to the diode matrix 126 for "strobing" the diode matrix 126 for a period of one hundred Milliseconds, providing the eleven MSB outputs and the ten LSB outputs, thereby decoding the information for blocking purposes.

More specifically, the first row memory 130 comprises an eight bit memory device which, for example, may be implemented by two RCA type DC4019 quad and/or select gates connected for operation as latch circuits for storing the eight bits provided over the sensor input lines S1–S8. The second row memory 131 is implemented in the same fashion. The detector circuit 132 may comprise and OR circuit which responds to a signal on any one of the eight input lines to provide an output which enables the row one and row two load memory circuits 133, 134 to reset the first and second row memory circuits and to provide signals for loading the sensed data into the first and second row memory circuits. The second row gating circuit 135 responds to the output of the detector circuit to allow the loading of the second row memory for a period of up to two seconds, depending on vehicle speed, as the reed switches move from a position overlying the first row magnets to a position overlying the second row magnets. The RB generator circuit 136 responds to the trailing edge of the load second row memory signal provided by the row two load circuit to provide a one hundred millisecond pulse for reading or strobing the diode matrix 126.

The input D1–D8 are direct representations of the first row floor code. Inputs D9–D12 are the complemented "OR" products of the signals on respective line pairs D1–D2, D3–D4, D5–D6, and D7–D8, such OR function being effected by OR gates included in the first row memory. This permits the use of one or two magnet first row codes. Similarly, inputs A1–A8 are the direct representation of the second row floor code, and inputs A9–A10 are the complemented "OR" products of the signals on lines A1–A4 and A5–A8, respectively which are provided by OR gates included in the second row memory so as to permit the use of one or two magnet codes. The LSB lines are the diode ANDED product of lines A1–A10 and the MSB lines are the diode ANDED products of lines D1–D12. Lines LSB and MSB may be formed in accordance with Table II.

TABLE II

| LSB Line | A-Line No. | MSB | D-Line No. |
|---|---|---|---|
| 1 | 1, 10 | 1 | 1, 11 |
| 2 | 2, 10 | 2 | 2, 11 |
| 3 | 3, 10 | 3 | 3, 11 |
| 4 | 4, 10 | 4 | 4, 11 |
| 5 | 5, 9 | 5 | 5, 9, 10 |
| 6 | 6, 9 | 6 | 6, 9, 10 |
| 7 | 7, 9 | 7 | 7, 9, 10 |
| 8 | 8, 9 | 8 | 8, 9, 10 |
| 9 | 1, 5 | 9 | 1, 5 |
| 10 | 2, 5 | 10 | 2, 5 |

TABLE II-continued

| LSB Line | A-Line No. | MSB | D-Line No. |
|---|---|---|---|
| | | 11 | 3, 5 |

The turns lists are diode "OR" products of the LSB lines, and are assigned in accordance with the floor layout for a particular application.

The second and first row codes in combination also generate one or more of six discrete augment lines 145 which are used for instructing the logic if the code just read belongs to any special groupings, such as a convergence code or a bypass code. The augment lines are labelled Converge Q0, Converge Q1, Disable, Bypass N=1, Bypass N≦3, and Short Bypass, and their purpose will be shown hereinafter.

In operation, the magnetic floor code is detected by the read switches 31 as the vehicle travels over the code magnets embedded in the floor. The data provided by the read switches 31 responsive to the magnet or magnets of the first row is fed into the first row memory 130 under the control of the row one load memory circuit 133. The first row memory 130 delivers logic level signals to the programmer diode matrix 77 where it is decoded for stops, frequency changes, etc., and to the diode matrix 126 where the signals are decoded for blocking purposes.

As the vehicle continues to travel and the reed switches 31 move out of the first row area, second row gating takes place. When the second row is encountered, the magnet information is loaded into the second row memory under the control of the row two load memory circuit 134 which in turn is enabled by the second row gating circuit 135. The information stored in the second row memory 131 is extended over buffers 137 to the diode matrix 126 where it is decoded for blocking purposes, station digits and turns lists.

Upon leaving the second row code magnet or magnets, the reed switches close, causing the detector circuit 132 via second row gating circuit 135 to enable signal generator 136 which provides signal RB for "strobing" the diode matrix 126 providing the eleven MSB outputs and the ten LSB outputs.

Memory Circuits

Referring to FIG. 6A, in addition to the present address memory 80 and the past address memory 81, the memory circuits 79 include encoders 141 and 142, an adder circuit 150, memory control logic 149, and bypass logic 128. The present address memory 80 includes a present MSB section 80A, a present LSB section 80B and a present augment section 80C. Similarly, the past address memory 81 includes a past MSB section 81A, a past LSB section 81B and a past augment section 81C.

The signals provided on the MSB output lines 138 and the LSB output lines 139 are extended over respective encoders 141 and 142 to the present MSB memory 80A and the present LSB memory 80B. The encoders 141 and 142 encode the signals on the MSB and LSB output lines, respectively into four bits and present this information to the respective MSB and LSB memory sections. Any bit present on the MSB encoder input produces a signal MSB present over an output 141A which is extended to the memory control logic 149 which initiates loading of the information into the present memory 80 as well as the transfer of the information from the present memory 80 to the past memory 81.

The memory control logic 149 responds to the signal MSB to provide a signal Load Past Memory which causes the data provided at the outputs of the present memory sections 80A, 80B with data from the adder and augment memory 80C to be loaded into respective sections 81A-81C of the past memory. The memory control logic then provides signals Load Present MSB and Load Present LSB causing the new data to be loaded into present memory sections 80A and 80B. Finally, a signal Load Augment causes the loading of data on augment lines to be loaded into present memory section 80C. The augment lines Converge Q0 and Converge Q1 (FIG. 6) provide information for convergence which is presented to the augment memory portion 80C in addition to the short bypass signal for short bypass operation. Bypass information from the augment lines Bypass N=1 and Bypass N≦3 provide information for the bypass logic 128. A disable function from augment line Disable prevents the memory control logic 149 from functioning when necessary, as for example when a non-blocking code is detected. For such condition, the sensed code is not loaded into the memory.

The bypass logic 128 generates two bypass information signals Q1 and Q0 one of which is supplied to an adder 150 associated with the present memory 80 which permits modification of the present address for diverging bypass situations. The adder 150 responds to signal inputs from the bypass logic to modify the block number, without expansion, to enable an "according to frequency" sort of operation. The present address data supplied to the adder 150 is modified at bypass points in accordance with the present/past frequency in order to obtain a block number option depending upon the operating frequency. This enables vehicle control circuits to look ahead on a path to determine if it is clear, and if there is a vehicle ahead on the path then a set new path frequency operation is initiated. The adder 150 is also used to raise the beginning of the block bit stream a certain number of bits to provide a 128 millisecond communication time for special information transmission between the central control unit 28 and the mobile vehicles at the start of each frame of time slots. The length of the communicating time is established by hardwired connections by way of a program device 152. The bypass circuits 128 also provide a signal Bypass Block which is supplied to the synchronous circuits for enabling the vehicle to bypass an occupied block when a blocking signal is received. The bypass logic 128 provides past frequency information to past frequency set drivers 129 which provide control outputs to the vehicle guide path detector.

Considering the memory circuits 79 in more detail, the encoders 141 and 142 may comprise two, cascaded type 4532 priority encoders. Each discrete input has a number assigned to it, and the input with the greatest absolute value is encoded into binary. The binary outputs are "ORED" and the GS bit is used for the third order binary bit. In addition, the enable out from each of the lowest priority encoders for the LSB and MSB encoder sections are combined by exclusive OR gates 146 which provide signals Load LSB and Load MSB for use by the memory control 149 and bypass logic 128.

Each of these sections 80A-80C of the present memory, as well as sections 81A-81C of the past memory, may comprise an RCA type 4042 clocked QUAD-D latch circuit. Data inputs for the present MSB and LSB memory circuits is provided by respective MSB and LSB encoders 141 and 142. The data from the augment memory 80C is provided by augment lines Converge Q0 and Converge Q1. Clock inputs for the memory circuits 80A-80C are provided by the memory control logic over respective lines 149A-149C.

The adder 150 may comprise two RCA type CD4008 four bit adders which are interposed between the four output line sets 80A' and 80B' of the present MSB and LSB memory circuits and the four output line sets 160 and 161 of the present memory circuits 80. The adder 150 raises the LSB and MSB information absolute value. The two bypass information signals Bypass Q0 or Bypass Q1 increment the lowest bits of the address by binary 10, 01, or 11. The upper six bits can be programmed by program device 152 to provide communication time by providing a "Dead area" after the sync signal by raising the effective location number by increments of 16 milliseconds.

The present memory MSB, LSB and augment data which is provided in respective output lines 160, 161 and 162 is extended to the present compare circuit 82 (FIG. 8) of the synchronous circuits, and to the past memory circuits 81, all sections 81A-81C of which receive a clock input over line 149D from the memory control logic 149.

Figure 7:
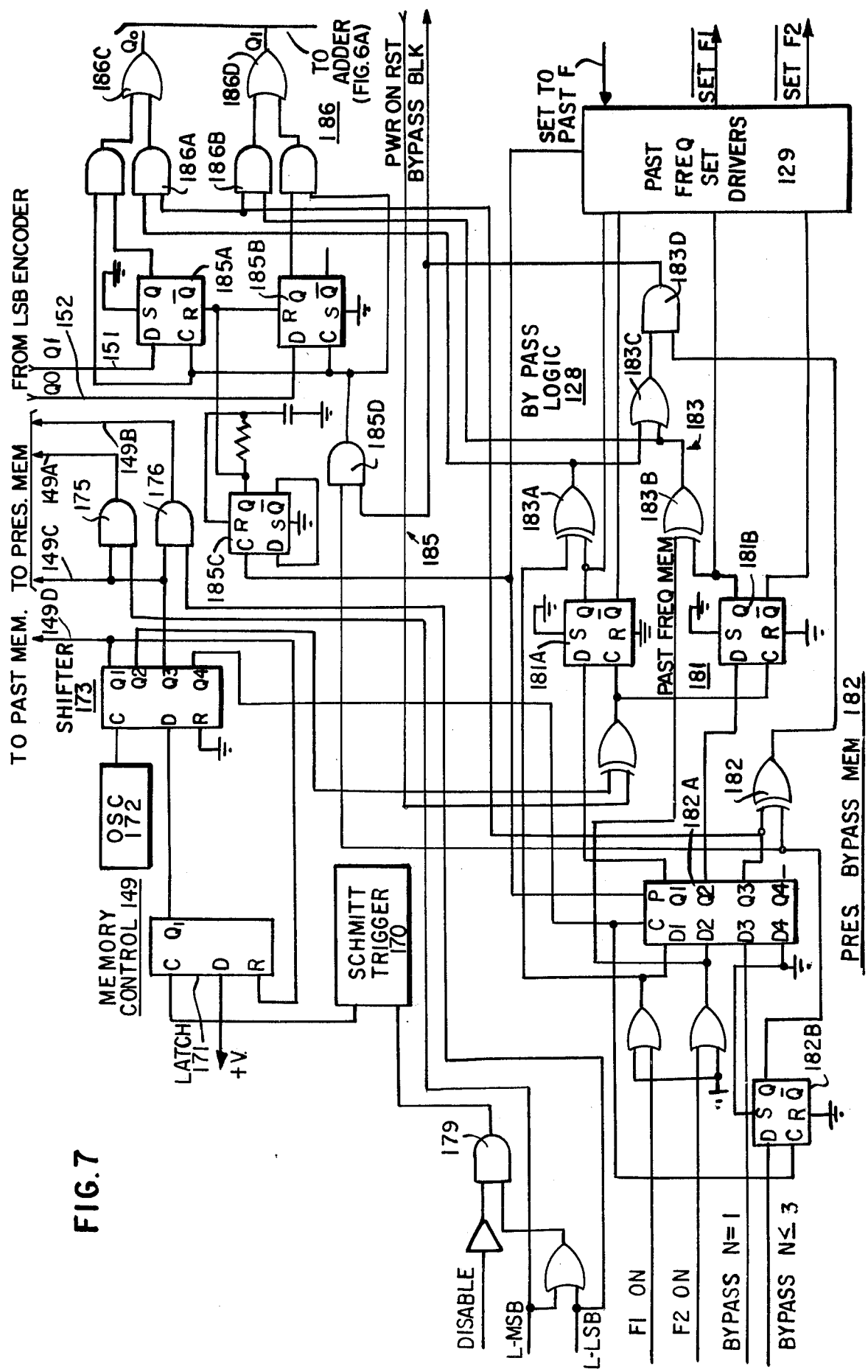
FIG. 7 is a detailed schematic circuit diagram of memory control logic and bypass logic of the asynchronous circuits shown in FIG. 6.

Referring to FIG. 7, the memory control logic 149 includes a Schmitt trigger circuit 170, a latch circuit 171, an oscillator 172 and a shifter 173. The Schmitt trigger circuit 170 responds to either signal load LSB or load MSB and a signal DISABLE to set the latch 171 thereby enabling the oscillator 172 to successively clock high the outputs Q1-Q4 of the shifter 173, which comprises a static shift register, such as the RCA type CD4015. The shift register 173 has its output Q1 connected over line 149D to the clock inputs of the past memory sections 81A-81C, and its output Q2 connected to the clock input of a past frequency memory 181 of the bypass logic 128. A third output Q3 is connected over line 149C to the clock input of the present augment memory, and to enable gates 175 and 176 which have outputs connected over respective lines 149A and 149B to the clock inputs of the present LSB and MSB memory sections. Gates 175 and 176 are enabled by signals Load MSB and Load LSB, respectively. A fourth output Q4 is connected to the clock input of a present bypass memory 182 of the bypass logic 128.

The bypass logic 180 includes the present bypass memory 182, including a four bit latch 182A shown embodied as an RCA type CD4042 clocked latch, which stores frequency and conversion information signals including signals F1, F2, and Bypass N=1. A further latch 182B stores signal Bypass N≦3. The frequency data stored in the present bypass memory 182 is used by the past frequency memory 181, shown implemented by a pair of RCA type CD4013 dual D flip flops 181A and 181B which over associated output gating circuits 183 control the setting of the past frequency set drivers 129.

The bypass logic further includes memory adder driver circuits 185 which may comprise three RCA type CD4013 dual D flip flops 185A-185C which respond to the two least significant bits of the LSB encoder output and clock signals provided by the present bypass memory 182 and the past frequency memory 181 to control associated output logic gates 186 to provide bypass information signals Q0 and Q1, which increment the memory address for converging operations.

Operation of Memory Circuits

With reference to FIGS. 6A and 7, in response to sensing of a floor code, the data provided over the MSB lines 138 and the LSB lines 139 is supplied to respective encoders 141 and 142 which encode the data into two sets of four bit lines prior to application to the present MSB memory 80A and the present LSB memory 80B. Also, if the code sensed corresponds to a converging point or short bypass point, the memory expand information provided on the augment line Converge Q0 or Converge Q1 is supplied to the present augment memory 80C. If the code sensed indicates a bypass decision point (some decision points are not bypass decision points), the bypass information on augment lines Bypass N=1, or Bypass N≦3 is extended to inputs of the present bypass memory 182, shown in FIG. 7.

The advent of a Load MSB command over line 141A produces a signal via gate 179 which enables the Schmit trigger 170, if no disable command is present, which clocks the latch 171, this produces a signal putting data to the shifter 173. The oscillator runs and clocks the Q1 output of shifter 173 high, causing the past memory 81A-81C to load information provided at the output of the present memory circuits 80A-80C and resets the latch 171. The trailing edge of the output pulse latches information in the past memory. The second oscillator pulse provided clocks in the Q1 bit to output Q2, providing a pulse which clocks the information stored by present bypass memory into the past frequency memory 181. The third oscillator pulse brings shifter output Q3 high and output Q2 low. This provides an output on line 149C which clocks data into the present augment memory 80C and either or both of the LSB or MSB memory through gates 175 and 176 and lines 149A-149B. The fourth oscillator pulse causes output Q3 to go low and output Q4 to go high, enabling the present bypass memory 182A to receive the frequency data F1 on, F2 on, and bypass N=1 and clocks bypass N≦3 information into latch 182A, and signal Bypass N≦3 into latch 182B.

Thus, the data stored in the present memory 80 is transferred to the past memory 81, including converging data and the newly sensed code information is loaded into the present memory 80. Also, present bypass information is transferred from the present bypass memory 182 to the past frequency memory 181.

A signal Power on reset, provided by the synchronous circuits causes clearing of the memories on power turn on.

Bypass N=1

An example of a decision point having one turn in one block code distance (N=1) is point 17 (FIG. 2). The coding afforeded by code device 52 as decoded by the diode matrix 126 results in a high level on signal line Bypass N=1, thereby causing output Q3 to go high when the data is loaded into the present bypass memory 182A. This enables the blocking logic 88 to attempt to defeat the turn if a blocking signal is received.

In the mode bypass N=1, wherein one bypass path is available, the past frequency and present frequency are exclusive OR'd via gates 183A and 183B, and if the product is other than 00 the output of gate 183C goes high and the bypass block line goes high via gate 183D. The "exclusive or" output is ANDed with signal Bypass N=1 by gates 186A and 186B, and via gates 186C and 186D goes to the adder 150 to increment the address by the exclusive or product amount. A reset to past frequency is effected by the blocking logic 88 indicating a turn defeat is in order should a proper block signal be received. This permits testing for the presence of a vehicle in the alternate path.

Bypass N≦3

An example of a diverging bypass having more than one bypass path in one block zone is shown in FIG. 10. Code device 51' provides the initial block code which as decoded by the diode matrix provides signal Bypass N≦3 for use by the bypass logic. Code devices 52A, 52B and 52C provide non-blocking codes as well as decision point information. The non-blocking codes are not entered into memory. Blocking codes are provided by code devices 58', the endings of which are entered into the memory after the turn is completed.

In the bypass N≦3 mode, wherein three bypass paths are available, the information is processed in a similar way up to the output of gate 183D. Then the signal Bypass N≦3 information is ANDed with the output of gate 183D and the Bypass N≦3 memorys 185A and 185B are clocked. The information stored consists of the two least significant bits from LSB encoder 142 provided over lines 151 and 152. The output of the Bypass N≦3 memory 185A and 185B is ANDed with the signal output of gate 185D and used to increment the address by this number. Should a reset to past frequency is effected by the blocking logic 88, the outputs to the adder terminate due to the like frequencies, restoring the basic block number. The Bypass N≦3 and N=1 modes require only a change in frequency then they are active to initiate logic operation. They are not dependent on the load commands. The past frequency set drivers 129 use the information in the past frequency memory 181 in conjunction with the a command Set to past F provided by the logic circuits 88 to drive the outputs SET F1, SET F2 which are extended to the guidance control of the vehicle.

Synchronous Circuits

Figure 8:
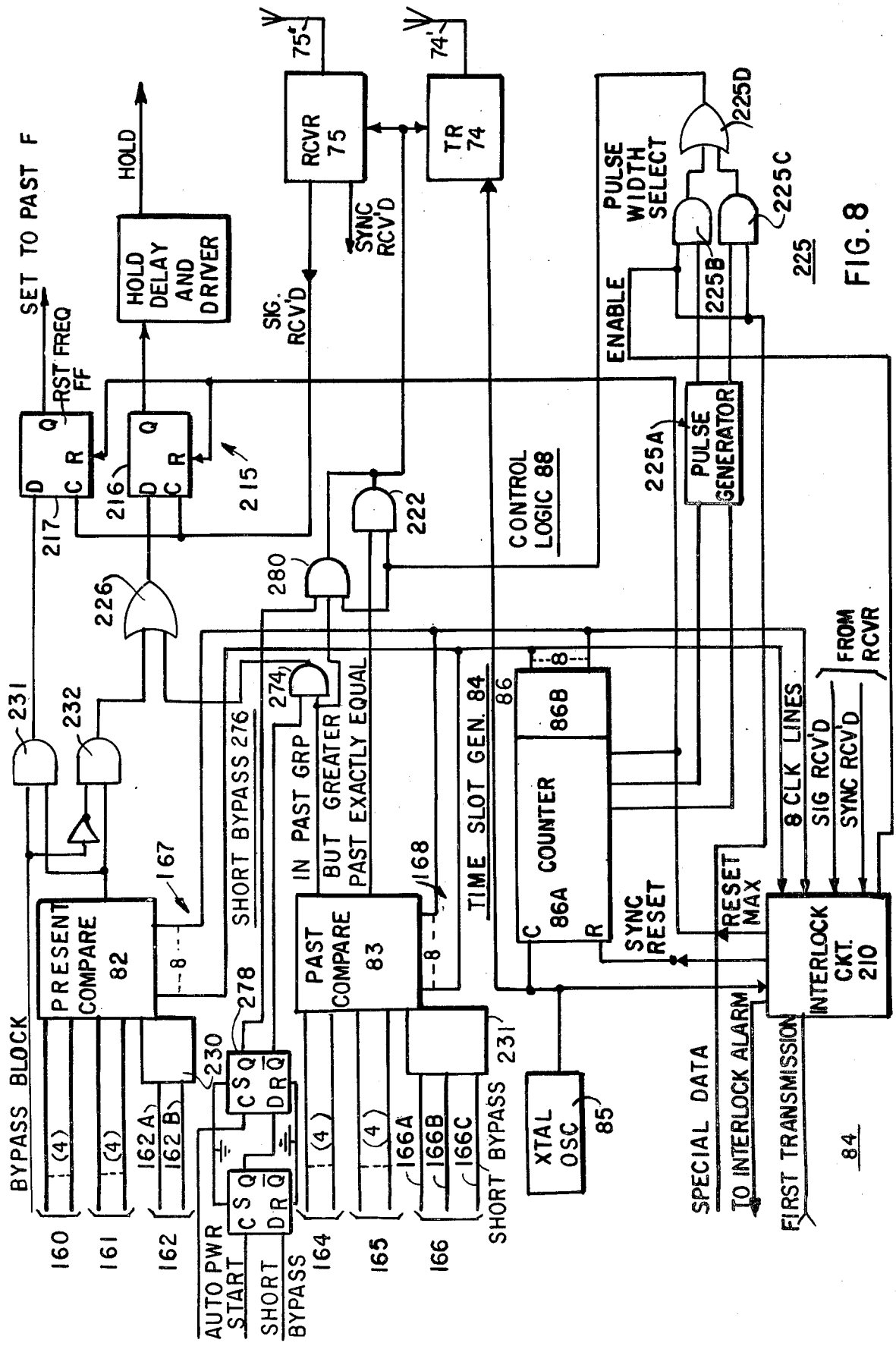
FIG. 8 is a simplified schematic and partial block diagram of synchronous circuits and Rf circuits of the vehicle control circuits.

Referring to FIG. 8, there is shown a schematic and partial block diagram for the synchronous circuits 71. The present address information, including present LSB (four bits), present MSB (four bits) and present augment data (two bits), is supplied to the present compare circuit 82 over line sets 160–162, and the past address information, including past LSB (four bits), past MSB (four bits), and past augment data (two bits), is supplied to the past compare circuit 83 over line sets 164–166. The present compare circuit 82 and past compare circuit 83 each have eight input lines 167 and 168, respectively connected to outputs of the counter 86 which has two stages 86A and 86B driven by a crystal oscillator 85 for defining the time slots.

An interlock circuit 210 of the time slot generator 84 monitors the synchronizing signal and assures that a sync signal is received and is received at the proper time.

The present compare circuit 82 and past compare circuit 83 individually compare the state of the counter 86 as represented by the binary input supplied over the eight input lead pairs 167 and 168 with the binary coding of the present and past addresses (LSB and MSB bits) supplied from the corresponding memory circuits 80 and 81. The present compare circuit 82 controls hold logic, indicated generally at 215, of the control logic circuits 88 which effects the generation of a hold command via hold latch 216 for halting the vehicle when a blocking signal is received during the time slot corresponding to the present address for the vehicle. In bypass situations, that is, whenever signal Bypass block provided by the bypass logic is high, the logic circuits 215 generate a signal Set to Past F via latch 217 which is provided to the past frequency set drivers 129 to effect reset of the guidance frequency for the vehicle to the past frequency in an attempt to bypass a congested block.

The output of the past compare circuit 83, is extended to an AND gate 222 which is clocked by a 0.66 millisecond pulse provided by a pulse generator 225 to enable the transmitter 74 to transmit the position signal for the vehicle. The past compare circuit 83 also provides a signal In Past Group But Greater which via OR gate 226 controls the setting of the hold latch 216 in converging situations when a blocking signal is received from a vehicle traveling towards a convergence point on a parallel path.

More specifically, the present compare circuit 82 comprises two type 340085 four bit comparators which receive the present address data and in normal operation provide an output upon coincidence of the eight input address bits and eight bits representing the count of the counter. An expand circuit 230 responds to signals provided over lines 162 by the present augment memory under converging conditions to provide either expand by 2 or expand by 4 modes. When the expand by 2 input 162A is high, the least significant bit is gated off and the line over which it is normally supplied to the comparator is strapped to the input of equivalent value on the other side of the comparator. This causes the comparator to only compare the seven remaining bits of the binary number. The "present" output remains high twice as long as this mode.

In the expand by 4 mode, the two lines 162A and 162B are high, and the two "present" least significant bits are gated off and the counter inputs substituted. The "present" output remains high for four times as long as in the normal mode of operation.

The past compare circuit 83 is generally similar to the present compare circuit 82, but includes an additional comparator circuit, enabling the past compare circuit 83 to provide outputs "Past equal" for transmission purposes, and "Past But Greater", for use in converging situations.

The output of the present compare circuit 82 is ANDed via gate 231 with signal Bypass Block to provide for controlling the frequency reset latch 217 which is clocked by each position signal received from another vehicle by way of receiver 75. The "present" output is also used for hold functions where signal Bypass Block is low, the "present" signal is extended over gate 232 and is ORed via gate 226 with signal Past But Greater which signal is high whenever an expanded condition is true and the past address is less than the count of the counter 86. The output of gate 226 enables the hold latch 216 to be set in response to a signal received from another vehicle.

The "past" exactly equal output of compare circuit 83 is ANDed with the pulse width signal provided by the pulse generator 225, providing a signal for enabling the transmitter 74, and for disabling the received signal line of the receiver 75. The pulse generator 225 includes a pulse width generator circuit 225A which is enabled by the counter 86 to provide two signals both of which are delayed 1 millisecond relative to the start of each time slot. One signal, 0.66 milliseconds long, is extended to gate 225B and the other signal, 1.32 milliseconds long, is extended to gate 225C. In normal operation, gate 225B is enabled by a signal provided by the interlock circuit 210 to enable the transmitter during the second, one-millisecond portion of time slot corresponding to the vehicle past address. The gate 225C is enabled by "special data" input which is high whenever the vehicle is sending data to the central control.

With reference to the time slot generator 84, the crystal oscillator 85 provides a signal at a frequency 4.096 MHZ which is counted down by counter section 86A to provide outputs at frequencies of 250 HZ and 500 HZ which are supplied to the pulse generator 225. The 250 HZ output is also supplied to the other counter section 86B which counts down such signal to provide the eight binary outputs for the compare circuits 82 and 83.

Interlock Circuits

The interlock circuits 210 provide signals Sync Reset and Max reset, which control the reset of the hold latch 126 and the reset frequency flip flop 217, and hold the counter sections 86A and 86B reset when power is initially applied to the vehicle control circuits.

Figure 9:
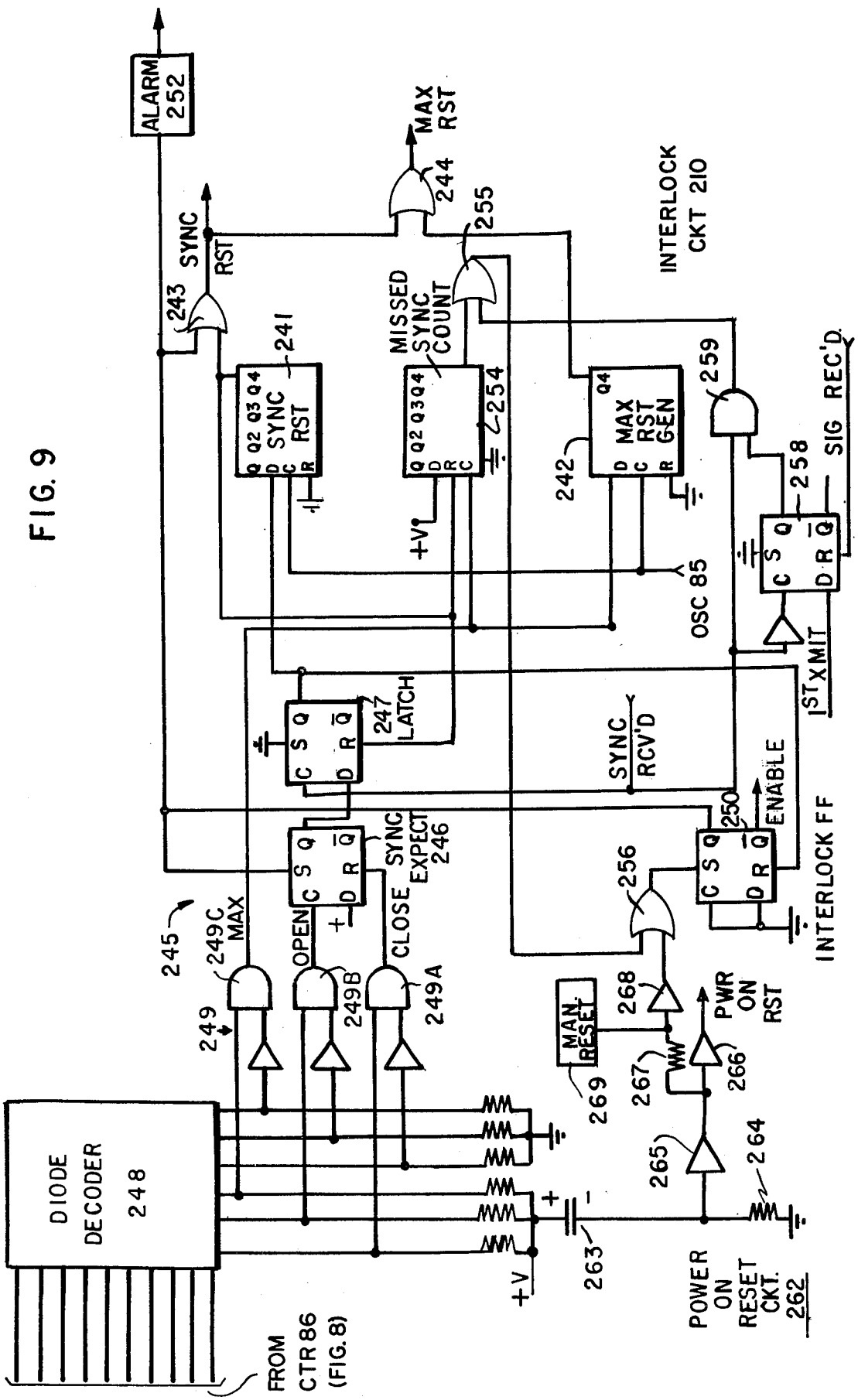
FIG. 9 is a schematic circuit diagram of an interlock circuit of the synchronous circuits of the vehicle control circuits; and, FIGS. 10, 10A, 10B and 10C are simplified representations of portions of the traffic layout.

Referring to FIG. 9, the interlock circuits include a sync reset circuit 241 and a max reset circuit 242 which generate signals Sync Reset and Max Reset via gates 243 and 244. The circuits 241 and 242, which may be RCA Type CD4015 static shift registers, are controlled by a sync expect circuit, indicated generally at 245, including a sync expect flip flop 246 and a sync latch 247 which is set each time a sync signal is received.

The interlock circuits 210 further include an inerlock flip flop 250 which when set enables an interlock alarm 252. A missed sync counter 254, which may be a Type CD4015 shift register, sets the interlock flip flop 250 via gates 255 and 256 upon lack of reception of a given number of consecutive sync signals. The missed sync counter 254 and the sync latch 247 are reset by the sync reset circuit 241 each time a sync signal is received. A signal received latch 258 sets the interlock latch 250 via gates 259, 255, and 256 whenever a signal fails to be received between consecutive sync signals.

The sync expect circuits 245 include a programmable diode matrix 248 which decodes the outputs of counter section 86B and provides outtputs at preselected counts which via gates 249 cause the setting and resetting of the sync expect flip flop 246. The sync expect flip flop 246 is reset at a count of one and then set four milliseconds prior to the time the sync signal is expected. Gate 249C provides a signal Max at the time that should be coincident with the receipt of the sync signal. The signal Max clocks the missed sync count circuit 254 and places a high level on a data input of the "max" reset generator circuit 242 which is driven by the oscillator 85 to effect reset of the counter stage 86B at the proper time if the sync signal is not received.

Initial Turn On

The interlock flip flop 250 is set at power on by the signal Power On Reset. The interlock flip flop 250 enables the interlock alarm 252, sets the sync expect flip flop 246 and, via gates 243 and 244, resets the hold flip flop 216 and the reset frequency flip flop 217 and places a high level on the reset inputs of the counter sections 86A and 86B.

Start Synchronization

The receipt of signal Sync Received clocks the sync latch 247 which resets the interlock flip flop 250 and provides a high level at the data input of the sync reset circuit 241 which is clocked by the oscillator 85. With the advent of the sync signal, the clock signal shifts the data present at the data input through the shift register 241. When the Q4 output of circuit goes high, the sync latch 247 and the missed sync count circuit 254 are reset, and gate 243 is enabled causing its output to go high, providing a one millisecond reset pulse to the hold latch, the reset frequency latch, and the counters 86A and 86B.

Interlock Operation

With the trailing edge of each reset pulse, the counters 86A and 86B run. The first counter 86A clocks the second counter 86B at a 250 HZ rate. The output of the second counter 86B is extended to the diode matrix 248 which decodes the counter outputs and controls gates 249. At binary count one, gate 249A is enabled, resetting the sync expect flip flop 246. At the binary count which occurs four milliseconds prior to the time the sync signal is expected, gate 249B is enabled, clocking the expect sync flip flop 246 high. The signal Max occurs at the maximum binary count used, that is at the time that the sync signal should be received. The signal Max clocks the missed sync count circuit 254 and puts a high on the data input of the max reset generator 242. The max reset generator resets only the second counter 86B with a one microsecond pulse. In the absence of sync signals, when the missed sync count circuit 254 reaches four, its output goes high and through gates 255–256 sets the interlock flip flop 250 enabling the interlock alarm 252 and inhibiting the counters 86A and 86B. Each sync signal is clocked through gate 259 if the signal received flip flop 258 is set. Any incoming received signal resets the signal received flip flop and if two sync signals are received and latch 258 has not been reset, gates 259 and 255 cause the setting of the interlock flip-flop 250 via gate 256.

Operation of Synchronous Circuits

The operation of the interlock circuit to effect stopping of the vehicle in response to loss of the sync signal has been described above. Accordingly, for purpose of illustration of the operation of the synchronous circuits, it is assumed that the sync signal is being received by receiver 75 at the proper time, enabling the time slot generator 84 to provide timing signals defining the time slots. Also, as indicated above, the pulse generator 255 is enabled at a four millisecond rate by the 250 HZ output of the time slot generator 84 to provide a 0.66 millisecond pulse to the transmit enable gate 222 during the second pulse to the transmit enable gate 222 during the second one millisecond portion of each four millisecond time slot (FIG. 5A) defined by the time slot generator 84. The manner in which the synchronous circuits use the present address and past address information in effecting position signal transmission and bypass and blocking operation is now set forth.

Position Pulse Transmission

Referring to FIGS. 2 and 8, for purposes of illustration of the operation of the synchronous circuits, it is assumed that vehicle 35 has been instructed to proceed from station 9 to station 3 over the shortest route, which includes secondary path 16A. The vehicle 35, illustrated as having just left station 9 has a past address corresponding to the coding provided by code device 49 and a present address provided by the code device 51 associated with station 9.

The past address information is supplied over lines 164 and 165 to the past compare circuit 83 and is compared with the binary state of the counter 86B as indicated by the binary coded signal supplied to the past compare circuit 83 over lines 168. When the eight binary bits corresponding to the past address are the same as the eight binary bits corresponding to the state of the counter, the past compare circuit 83 provides signal Past Exactly Equal which is extended to gate 222. Gate 222 is enabled by the 0.66 millisecond pulse provided by the pulse generator 225 enabling the transmitter 74 to provide the position signal for the vehicle, and couple the position signal to the guide line 15 for transmission thereover to the other vehicles. As the vehicle 35 continues its movement along path 15 and turns onto secondary path 16A proceeding towards its designated station 3, each time the code provided by the code devices in its forward path is sensed, the past address is changed to the coding provided by the previous code device, and its position signal is transmitted in the time slot corresponding to such code device.

Blocking and Bypass Operation

The vehicle 35 reaches decision point 17 and senses the code provided by code device 52, and its past address is changed to the coding of device 51. Since vehicle 35 has been instructed to turn on to path 16A, programmer 77 effects a change from frequency f1 to frequency f2 to initiate the change. Also, since code device 52 indicates that a bypass path 62 is available, then the bypass logic circuits provide signal Bypass Block which primes gate 231 and inhibits gates 232. Accordingly, when the eight data bits representing the present address, incremented through the adder 150 by the bypass logic 128, supplied to the present compare circuit 82 over lines 160 and 161, correspond to the state of the counter 86B, as indicated by the eight binary signals supplied to the present compare circuit 82 over lines 167, gate 231 is enabled, providing a high level at the data input of the frequency reset flip flop 217. If a blocking signal is received from another vehicle during such time slot, the high level is clocked into the frequency set flip flop 217 providing signal Set to Past Frequency which is extended to the past frequency set drivers 129 of the bypass circuits 138 (FIG. 7). This causes the frequency to be reset from f2 to f1 thereby defeating the turn. In addition, the present address of the vehicle 35 is decremented by way of the bypass logic 128 as indicated above to determine if a further vehicle is traveling along the alternative route. Further, the bypass logic responds to the signal Set to Past Frequency to cause the signal Bypass Block to go low thereby inhibiting gate 231 and priming gate 232. Thus, when the decremented address compares with the state of the counter 86B, gate 232 is enabled providing a high level at the data input of the hold latch 216 via gate 226. If a signal is received during the time slot corresponding to the "non-decremented address" for the vehicle 35, the hold latch is set causing the vehicle to be halted.

Assuming the vehicle 35 has turned on to the secondary path 16A, the vehicle continues its travel along path 16A towards convergence point 18 where path 16A rejoins the main path 16. When the vehicle reaches code device 54, which provides a converging code, the control circuits of the vehicle 35 "listen" for blocking signals provided by vehicles traveling ahead of vehicle 35 along path 16A as well as vehicles traveling along path 15 toward converging point 18. Referring to FIG. 10A, which is a simplified showing of the path portions 16A and 15 adjacent to the converging point 18, the second row codes (LSB bits) for code devices 54 and 54' have the same upper seven bits, whereas the lowest LSB bit for code device 54 has a logic zero coding and the lowest LSB bit for code device 54' has a one coding. Accordingly, path 15 has a "higher priority" than path 16A at this point. When the coding provided by code device 54 is sensed, output Converge Q0 is provided to the present augment memory causing the expand by two device 230 associated with the present compare circuit to widen the spread of the apparent address so that the blocking logic will respond not only to the detection of a blocking signal provided by a vehicle traveling along path 16A but also to a blocking signal provided by a vehicle traveling along path 15. In either case, gate 232 is enabled permitting the setting of the hold latch 216 in response to a signal received. As the vehicle continues traveling along path 16A and reaches code device 55 the coding of which is identical to that of code device 55' in path 15, then the present address for the vehicle is changed to the coding of device 55 and its past address becomes the coding of device 54. Also, since with the change in address the data stored in the present augment memory is transferred to the past augment memory, the past compare expander circuit 231 is enabled to expand the apparent address for the past compare circuit 83. The past compare circuit provides signal In Past Group But Greater whenever its expand circuit 231 is enabled, and the past address is less than the count of the counter 86B. Accordingly, should a vehicle be traveling along path 15 and transmitting a position signal during the time slot assigned to code device 54', the signal In Past Group But Greater will be provided and extended over gate 226 to the data input of the hold latch 216, enabling the latch 216 to be set when the position signal is received.

A similar operation ensues at a converging point where there are more than two paths, as for example as illustrated in FIG. 10B where four paths are shown to converge at a point 18'. For such condition, the code devices 54A-54D all have codes in the same group with the upper six bits of the second row code being identical and the lower two LSB bits being assigned with device 54A having the highest binary weight and code device 54D having the lowest binary weight. The blocking code devices 55A-55D all have the same codes.

When the coding provided any of the code devices 54A-54D is sensed, this causes signal converge Q1 to be provided which effects and expand by two operation for the present and past compare circuits, enabling a vehicle traveling in any one of the four paths to "listen" for blocking signals provided by a vehicle traveling over any one of the other paths. In the case of a tie, the vehicle traveling over the path having the highest binary coding will be permitted to continue traveling along such path which vehicles along the remaining paths will be halted.

Once the vehicle 35 has reached converging point 18, it continues along to its designated station 3 whereupon sensing of the code provided by code device 67 associated with such station, the vehicle is halted.

Another converging situation illustrated in FIG. 10C involves a convergence after a single station divergence and is called a short sidepath operation. The short sidepath operation requires the use of both N=1 bypass and the short bypass input. These signals are obtained similar to N=1 and N≦3 from the Diode Matrix 126 (FIG. 6). The signals establish the decision point as both a diverging point and as a short sidepath converge code similar to the converge Q0 type in the past use only.

Referring to FIG. 10C, a vehicle entering sidepath 275 and moving towards code device 271, after making a decision to do so at decision point 270, has as its present address the block number related to decision point 270 plus the bypass data provided to the adder 150 (FIG. 6A) by the bypass logic 128. A vehicle staying on the main path 274 would have the unincremented present block number.

So far the entire process is exactly as described for blocking operation N=1. When the vehicle reaches code device 271 or 271', however, the operation changes. As the vehicle enters a new block at code device 271 or 27' and loading its past memory, the short bypass data, stored in the present augment memory is transferred to the past augment memory 81C and signal short Bypass is supplied to the Short Bypass Logic 276 shown in FIG. 8, which comprises two Type 4013 "D" Latches 277 and 278, and two AND gates 279 and 280. Signal Short Bypass is also supplied via lead 166C to expansion logic circuit 231 associated with the Past Compare circuit 83. This immediately initates expansion of the Past Compare circuit 83 through the expansion logic circuit 231. The vehicle traveling along the path 274 is on the "through" path and has priority for the converging situation because of its past block number. The vehicle on the "sidepath" 275 has lower priority and, because this is not a regular convergence, will not hold a tractor traversing path 274. This vehicle traveling on the side path also will stop at the non-blocking program stop 272. While the vehicle is stopped at 272, it transmits position pulses causing bypass operation at decision point 270.

Referring to FIG. 8, the latch circuits 277 and 278 are normally set to their false states and the high level signal at the false output of latch circuit 278 enables AND gate 279 to follow the signal In Past Group But Greater for priority blocking purposes.

When the vehicle is restarted by an operator, a signal start, indicating that the vehicle has been given a command to start, causes the signal Short Bypass (from the past augment memory) to be loaded into the latch so that its true output goes high, and then a signal Auto Power, indicating that drive power has been applied, loads the latch circuit 278 with the high level output of latch circuit 277. The false output of latch circuit 278 then inhibits AND gate 279, while the true output of latch circuit 278 primes AND gate 280. Since gate 279 is inhibited, this precludes the vehicle from being held and going into the following mode. Gate 280, as enabled by the past group signal, and gate 222, as enabled by the past equal signal, extend the transmit enable signal to the transmitter 74 so that position pulses are transmitted in both sections of the expanded past comparison while the vehicle travels toward the next block code device 273. This will halt any vehicle approaching the now moving vehicle. When the vehicle reaches the next block code device 273, and the data for code device 271 is loaded into the past memory, the operation becomes normal and only one position pulse, i.e. the past address, is transmitted.

The expand by two and expand by four codes used at converging points may also be used in diverging paths which do not always require bypass to expand the look ahead to the main and one or more secondary paths, depending on the number of guidance frequencies used which extend from the decision point being approached by the vehicle. The expansion codes enable the vehicle to listen for blocking signals from other vehicles ahead on the main and secondary paths to provide safety from collision when there is a possibility of two vehicles ahead on two separate paths.

In the foregoing description, the time slots are associated with blocks of the traffic layout, and the vehicle's present and past addresses are compared with the state of a counter in generating presence signals and hold commands. It is also possible to associate a different time slot with each of the vehicles, rather than with the blocks, and have each vehicle transmit an indication of its location during its assigned time slot or time channel so that the vehicle both identifies itself and indicates its location. In such arrangement, the past address stored in the past memory 81 can be used to enable the vehicle to transmit an eight-bit word representative of its location. The present compare circuit 82 can be used to compare the vehicle's present address with the addresses transmitted by other vehicles (rather than with the state of counter 86) and effect the generation of a hold command when a received address compares with the vehicle's present address. Timing signals to enable transmission and reception of the eight bit words during a time channel can be derived from the time slot generator 84. The assignment of a time slot to a given vehicle can be effected by hard-wiring the inputs of its past compare circuit 83 to suitable bias levels, rather than to the past memory outputs, so that the compare circuit 83 provides its output at the proper time during each frame.

Having thus disclosed in detail preferred embodiments of the invention, persons skilled in the art will be able to modify certain of the structure which has been disclosed and to substitute equivalent elements for those which have been illustrated, and it is therefore, intended that these and other modifications; and substitutions be covered as they are embraced within the spirit and scope of the appended claims.

We claim:

1. In a guidance system for guiding a plurality of vehicles along a traffic layout divided into a plurality of traffic control blocks, the combination comprising: identification means for each of said blocks which provide a unique identifying signal for each block; vehicle control means for each vehicle including heading means for directing the vehicle along the traffic layout, input means for receiving the identifying signal for a given block as the vehicle passes adjacent to its identification means, and means responsive to identifying signals received by said input means for generating position signals indicative of the location of the vehicle along the traffic layout, each of said vehicle control means including timing means operable when enabled to generate a plurality of timing signals which define a plurality of time channels, transmitter means, and enabling circuit means responsive to said timing signals and one of said position signal to enable said transmitter means to transmit a presence signal during at least one of said time channels indicative of a state of occupancy of a given block; and synchronizing means for periodically generating a synchronizing signal which is transmitted to the vehicles for enabling the timing means of each of said vehicle control means, thereby synchronizing the operation of the timing means for all of the vehicles.

2. A system as set forth in claim 1 wherein the vehicle control means for each vehicle further comprises receiver means for receiving presence signals transmitted by other vehicles, said enabling circuit means being responsive to said timing means and a received presence signal to halt the vehicle in its movement into a given block during the period another vehicle is transmitting a presence signal indicative of its occupancy of a block having a predetermined relation to said given block.

3. A system as set forth in claim 2 wherein said certain ones of said time channels are associated with different ones of said blocks, said timing means including means for counting the timing signals and for providing a plurality of binary coded signals, each identifying a different one of said time channels, and at least one of said position signals comprising a binary coded signal identifying the block in which the vehicle is located, and wherein said enabling circuit means comprises comparator means for comparing said binary coded timing signals with one of said position signals to provide a control output during the time channel associated with the block in which the vehicle is located, and hold means responsive to the control output provided as the vehicle enters a given block to halt the vehicle in its movement into said given block whenever a presence signal is received during the time channel associated with said given block.

4. A system as set forth in claim 2 which comprises guidance means for radiating guidance signals to define paths of said layout, said heading means including signal detecting means responsive to said guidance signals for enabling said vehicle to follow the paths of said traffic layout, the transmitter means and receiver means of each vehicle control means having respective output and input stages coupled to said guidance conductor means to enable the presence signals transmitted by each vehicle to be conducted through said guidance conductor means to other vehicles, and said synchronizing means being coupled to said guidance conductor means to enable the synchronizing signals to be conducted through said guidance conductor means to said vehicles.

5. A system set forth in claim 4 wherein said traffic layout has a main path and secondary path diverging from said main path at a decision point, said guidance means comprising a first guidance conductor extending along said main path and a second guidance conductor extending along said secondary path, first signal generating means for applying signals at a first frequency to said first guidance conductor for defining said main path, and second signal generating means for applying signals at a second frequency to said second conductor for defining said secondary path, said heading means including frequency responsive means adjustable to respond substantially only to the signals of one of said first and second frequencies to thereby control said vehicle to follow an alternative one of said main and secondary paths, and means responsive to receipt of the identifying signal provided by the identification means associated with said decision point to control said frequency responsive means to adjust to the one of the frequencies which represents the preferred route from said decision point to a preselected one of a plurality of stations located along said traffic layout, and wherein said secondary path coverages with said main path at a converging point having an associated identification means which provides converging code signals identifying such point as a converging point, said enabling means including expansion means operable when said input means detects said converging code signals to cause said comparator means to respond to presence signals transmitted in a plurality of time channels by a further vehicle traveling in a further block towards said converging point for controlling the travel of said first-mentioned vehicle through said converging point.

6. A system as set forth in claim 2 wherein said transmitter means for each of said vehicle control means is enabled to transmit a presence signal during the time channel associated with the block in which the vehicle was previously traveling and said enabling means responds to presence signals transmitted during the time channel in which the vehicle is presently traveling.

7. A system as set forth in claim 2 wherein said transmitter means is enabled to transmit presence signals during a plurality of time channels which are associated with blocks having a predetermined relation to the block in which the vehicle is presently traveling.

8. In a guidance system for guiding a plurality of vehicles along a traffic layout divided into a plurality of traffic control blocks, the combination comprising: identification means for each of said blocks which provide a unique identifying signal for each block; and vehicle control means for each vehicle including heading means for directing the vehicle along the traffic layout, input means for receiving the identifying signals for each block as the vehicle passes adjacent to the identification means for the blocks, means responsive to identifying signals received by said input means for generating position signals indicative of the location to the vehicle along the traffic layout, each position signal comprising a binary coded signal identifying the block in which the vehicle is located, timing means operable when enabled to generate a plurality of binary coded timing signals which define and identify a plurality of time channels, certain ones of said time channels being associated with different ones of said blocks, enabling means including a comparator circuit for comparing one of said position signals with said timing signals and for generating an enabling signal during at least one of said time channels, identified by a coded timing signal corresponding to said one position signal, and transmitter means responsive to said enabling signal to generate a presence signal representative of the location of the vehicle along the traffic layout.

9. A system as set forth in claim 8 wherein said vehicle control means further comprises receiver means for receiving the presence signals transmitted by other vehicles, and wherein said enabling means comprises a further comparator circuit for comparing a further one of said position signals with said timing signals and for generating a control signal during the time channel associated with a given block the vehicle is about to enter and identified by a coded timing signal corresponding to said further position signal, and hold means responsive to control signal and a received presence signal, indicative of occupancy of a block having a predetermined relation to said given block, to halt the vehicle in its movement into said given block.

10. In a guidance system for guiding a plurality of vehicles along a traffic layout divided into a plurality of traffic control blocks, the combination comprising: path defining means for defining said traffic layout; identification means for each of said blocks which provide a unique identifying signal for each block; and a control system for each vehicle including heading means responsive to said path defining means for directing said vehicle along said traffic layout; input means for receiving different ones of said identifying signals in response to movement of the vehicle adjacent to different ones of said identification means; each vehicle control system including control means operable when enabled to respond to said input means and provide a position signal indicative of the location of said vehicle along said traffic layout; synchronizing means at a control location for periodically generating a synchronizing signal which is transmitted to all of the vehicles; each vehicle control system further including timing means responsive to said synchronizing signal for generating a plurality of timing signals which define a plurality of time slots, different ones of said time slots being assigned to different ones of said blocks, transmitter means for each vehicle responsive to the position signal provided by its associated control means to transmit a presence signal during a time slot indicative of the block in which the vehicle is located, receiver means for each vehicle for receiving the presence signals transmitted by other vehicles, and hold means responsive to said position signal and a received presence signal to halt the vehicle in its movement into a given block during the period another vehicle is transmitting a presence signal indicative of its presence in a block having a predetermined relation to said given block.

11. A system as set forth in claim 10 wherein said path defining means comprises first guidance conductor means for radiating guidance signals at a first frequency for defining a main path of said traffic layout and second guidance conductor means for radiating guidance signals at a second frequency defining a secondary path of said traffic layout which diverges from said main path at a decision point, the presence signals of each of said vehicle control systems being transmitted over said guidance conductor means to other ones of said vehicles, and said path defining means further including signal generating means at said control location for generating guidance signals at said first and second frequencies for application to said first and second guidance conductor means, respectively, said vehicle heading means having frequency responsive means for sensing said guidance signals and controlling the travel of said vehicle over said main and secondary paths.

12. A system as set forth in claim 11, wherein the synchronizing signal is transmitted over said first and second guidance conductor means and received by the receiver means of each vehicle control system.

13. A system as set forth in claim 12 which includes first receiver means at said control location for detecting the presence signals transmitted over said first guidance conductor means and for applying said presence signals to said second guidance conductor means and second receiver means for receiving the presence signals transmitted over said second guidance conductor means and for applying said presence signals to said first guidance conductor means.

14. In a guidance system for guiding a plurality of vehicles along a traffic layout divided into a plurality of traffic control blocks, the combination comprising: path defining means for defining said traffic layout; identification means for each of said blocks which provide a unique identifying signal for each block; and a control system for each vehicle including heading means responsive to said path defining means for directing said vehicle along said traffic layout; input means including sensing means for sensing said identifying signals as said vehicle enters the associated block, encoder means responsive to said sensing means for providing data signals coded to represent information provided by the identification means; memory means for storing said data signals, said memory means including present memory means for storing data signals representing the identification of the block in which the vehicle is presently traveling, past memory means for storing data signals representing the identification of the block in which the vehicle was previously traveling; transmitter means operable to transmit a presence signal indicative of the location of said vehicle along said traffic layout; control means responsive to data signals stored by said past memory means to control the operation of said transmitter means; and receiver means for receiving presence signals transmitted by other vehicles, said control means being responsive to said first data signals stored by said present memory means and a received presence signal to halt the vehicle in its movement into a given block during the period another vehicle is transmitting a signal indicative of its presence in a block having a predetermined relation to said given block; memory control means responsive to said input means to be effective each time the vehicle enters a new block to cause the data signals stored in said present memory means to be transferred to said past memory means and to cause data signals, representing the identification of the new block, provided by said encoder means to be stored in said present memory means.

15. A system as set forth in claim 14 wherein said control means includes means responsive to said past memory means to enable said transmitter means to transmit said presence signal, and means responsive to said present memory means to enable said hold means to respond to a presence signal received from a further vehicle.

16. A system as set forth in claim 14 in which said identification means for each of said blocks comprises a plurality of code devices arranged in first and second rows, and wherein said input means comprises first and second two memory means, and means responsive to signal outputs of the code devices of the first row as sensed by said sensing means as the vehicle travels adjacent thereto to generate a signal for enabling said first row memory means to receive coded data signals representing information provided by said code devices of said first row, and means responsive to said first means for enabling said second row memory means to receive the coded data signals representing information provided by the code devices of said second row, said memory control means being responsive to an output of one of said first and second row memory means to effect the transfer of the data signals stored in said present memory means to said past memory means and to effect the transfer of code signals stored in said first and second row memory means to said present memory means over said encoder means.

17. A system as set forth in claim 16 wherein said code devices provide information identifying the block with which it is associated and further information representing heading information for said vehicle heading means.

18. In a guidance system for guiding a plurality of vehicles along a traffic layout divided into a plurality of traffic control blocks, the combination comprising: path defining means for defining said traffic layout; identification means for each of said blocks which provide a unique identifying signal for each block; and a control system for each vehicle including heading means responsive to said path defining means for directing said vehicle along said traffic layout; input means for receiving different ones of said identifying signals in response to movement of the vehicle adjacent to different ones of said identification means and for providing data signals indicative of the location of the vehicle along the traffic layout; present memory means for storing the data signals; past memory means for receiving said storing data signals from the present memory means to thereby store data signals representing the identity of the block in which the vehicle was previously traveling, time slot generating means for providing timing signals defining a plurality of time slots including a different time slot corresponding to each of said blocks; first comparator circuit means responsive to said timing signals and to data signals stored by said memory means to effect transmission of a position signal during the time slot assigned to the block in which the vehicle was previously traveling, and second comparator circuit means responsive to said timing signals and to data signals stored by said present memory means to generate an output to cause the vehicle to be halted whenever a position signal provided by another vehicle is received during the time slot assigned to the block in which the vehicle is presently traveling.

19. A system as set forth in claim 18 which further comprises memory control means responsive to said input means as said vehicle travels adjacent to the identification means for each block to effect the transfer of the data signals in said present memory means to said past memory means and to effect the storage in said present memory means of data signals representing the information provided by the identification means of the block which the vehicle is presently entering.

20. A system as set forth in claim 18 wherein said time slot generating means comprises a digital counter means operable when enabled to generate sets of digitally coded signals each defining a different one of said time slots, said past memory means and said present memory means each providing a set of digitally cooded signals as an address for the identity of the block in which the vehicle was previously traveling and the block in which the vehicle is presently traveling, said first and second comparator circuit means being operable to compare the sets of data signals provided by said counter means with the data signals provided by said past and present memory means in generating said position signal and said output for halting the vehicle.

21. A system as set forth in claim 20 which further comprises synchronizing means at a control location for generating a synchronizing signal for transmission to the vehicle control systems for all of said vehicles for synchronizing the operation of the counter means of each of said vehicles.

22. A system as set forth in claim 18 wherein said path defining means comprises guidance conductor means for radiating guidance signals for defining said traffic layout, said synchronizing signal and said presence signals being transmitted over said guidance conductor means.

23. In a guidance system for guiding a plurality of vehicles along a traffic layout, which includes at least one traffic path having a plurality of stations and a plurality of location identification points spaced along said path, including said stations, positioned at said points, the combination comprising guidance conductor means extending along said traffic layout, drive means for energizing said guidance conductor means to provide course-defining signals along said guidance conductor means, each of said vehicles including guide path sensing means for sensing the course defining signals to providing heading information indicative of desired route to a preselected one of said stations and control means for controlling route selection and advancement of said vehicle along said route, said control means including sensing means responsive to each location identification means to provide location data signals; control means responsive to data signals to generate a control output; transmitter means responsive to said control output to generate a presence signal indicative of the position of said vehicle, means for coupling said presence signal to said guidance conductor means for transmission thereover to other vehicles located on said traffic layout; and receiver means coupled to said guidance conductor means for receiving presence signals transmitted by other vehicles and for providing an output to said control means to effect halting of the vehicle in accordance with the location of the vehicle relative to other vehicles, and synchronizing means coupled to said guidance conductor means at a control location for generating a synchronizing signal which is transmitted over said guidance conductor means to all of said vehicles for synchronizing the operation of the control means thereof to thereby enable different ones of said vehicles to transmit their position signals during a different one of a plurality of time intervals each of which is indicative of a different location along the traffic layout.

24. In a guidance system for guiding a plurality of vehicles along a traffic layout divided into a plurality of traffic control blocks and having a main path and a seconary path diverging from said main path at a decision point and a plurality of stations located along said paths, the combination comprising: identification means positioned at a number of points along said layout, including said stations and said decision point, for providing coded information signals, including block-identification signals, the identification means at each of said points being operable to provide block identification signals which are different than the block identification signals provided at other points in the traffic layout, a control system for each vehicle for controlling the travel of the vehicle to a preselected station beyond said decision point over a first, preferred path, said control system including sensing means operative to sense the information provided by the identification means at said decision point, heading means for comparing information indicative of said preselected station with the location information provided by said sensing means, steering means operable to provide a steering signal representative of the preferred path for said identified decision point to said preselected station; transmitter means for transmitting a presence signal indicative of the location of the vehicle; receiver means for receiving the presence signals transmitted by other mobile vehicles located along said traffic layout; and control means for utilizing the received presence signals to over-ride the steering signal in the selection of a second, alternative path whenever the steering signal would otherwise direct a vehicle to enter the first path and encounter a congested traffic condition thereat, said control means including timing means operable when enabled for generating a plurality of timing signals defining a plurality of time slots, different ones of said time slots being assigned to different ones of said points along said layout, and said control means including means responsive to said timing signals and to the information sensed by said sensing means to transmit its position signal during the time slot assigned to the block in which the vehicle was previously traveling, said control means further including means responsive to presence signals received from other vehicles and to information sensed by said sensing means in selecting a path for the vehicle beyond said decision point; and synchronizing means for periodically generating a synchronizing signal which is transmitted to the vehicles for enabling the timing means of each of said vehicle control means, thereby synchronizing the operation of the timing means for all of the vehicles.

25. A system as set forth in claim 24 wherein said control means includes means responsive to information provided by said sensing means to be operable to provide a control output when a presence signal is transmitted by a further vehicle during the time slot assigned to the first block on the preferred path extending from said decision point, said control output being used to halt the vehicle in its movement into the first block of said alternative path extending from said decision point in response to the receipt of a presence signal during the time slot assigned to the first block of said alternative path extending from said decision point.

26. A system as set forth in claim 24 wherein said secondary path converges with said main path at a converging point, the identification means associated with said converging point providing converging code signals identifying such point as a converging point, said control means including expansion means responsive to said converging code signals to enable said hold means to respond to presence signals transmitted in a plurality of time slots which are assigned to blocks leading toward said converging point.

* * * * *

UNITED STATES PATENT AND TRADEMARK OFFICE
CERTIFICATE OF CORRECTION

PATENT NO. : 4,284,160
DATED : August 18, 1981
INVENTOR(S) : Robert DeLiban and David G. Lieby It is certified that error appears in the above—identified patent and that said Letters Patent is hereby corrected as shown below:

Column 28, line 65, "signal" should be ---signals---;

Column 29, line 48, after "and" insert ---a---;

Column 32, line 44, "two" should be ---row---;

Column 33, line 44, "cooded" should be ---coded---;

Column 34, line 38, "seconary" should be ---secondary---;

and

Column 34, line 57, "for" should be ---from---.

Signed and Sealed this

Thirteenth Day of July 1982

[SEAL]

Attest:

GERALD J. MOSSINGHOFF

Attesting Officer    Commissioner of Patents and Trademarks